(12) United States Patent
Vangbo

(10) Patent No.: US 9,341,284 B2
(45) Date of Patent: *May 17, 2016

(54) MICROFLUIDIC DEVICES WITH MECHANICALLY-SEALED DIAPHRAGM VALVES

(71) Applicant: IntegenX Inc., Pleasanton, CA (US)

(72) Inventor: Mattias Vangbo, Fremont, CA (US)

(73) Assignee: IntegenX Inc., Pleasanton, CA (US)

( * ) Notice: Subject to any disclaimer, the term of this patent is extended or adjusted under 35 U.S.C. 154(b) by 72 days.

This patent is subject to a terminal disclaimer.

(21) Appl. No.: 14/320,384

(22) Filed: Jun. 30, 2014

(65) Prior Publication Data

US 2015/0021502 A1   Jan. 22, 2015

Related U.S. Application Data

(63) Continuation of application No. 13/202,877, filed as application No. PCT/US2011/048527 on Aug. 20, 2011, now Pat. No. 8,763,642.

(60) Provisional application No. 61/375,791, filed on Aug. 20, 2010.

(51) Int. Cl.
| | |
|---|---|
| *F16K 31/00* | (2006.01) |
| *F16K 99/00* | (2006.01) |
| *B01L 3/00* | (2006.01) |
| *F04B 19/00* | (2006.01) |
| *F04B 43/04* | (2006.01) |

(52) U.S. Cl.
CPC ....... *F16K 99/0015* (2013.01); *B01L 3/502738* (2013.01); *F04B 19/006* (2013.01); *F04B 43/043* (2013.01); *F16K 99/0055* (2013.01); *F16K 99/0059* (2013.01); *B01L 2300/0816* (2013.01); *B01L 2400/0655* (2013.01); *F16K 2099/008* (2013.01); *F16K 2099/0084* (2013.01); *F16K 2099/0094* (2013.01); *Y10T 137/0324* (2015.04); *Y10T 137/0402* (2015.04); *Y10T 137/7895* (2015.04)

(58) Field of Classification Search
CPC .................. F16K 99/0015; F16K 99/0059
See application file for complete search history.

(56) References Cited

U.S. PATENT DOCUMENTS

| | | | |
|---|---|---|---|
| 2,677,390 A | | 5/1954 | Davis et al. |
| 3,490,479 A | * | 1/1970 | Hogel ............... F15C 3/04 137/625.12 |
| 3,633,605 A | | 1/1972 | Smith |
| 3,844,529 A | | 10/1974 | Brandt, Jr. et al. |

(Continued)

FOREIGN PATENT DOCUMENTS

WO   2011056215 A1   5/2011

OTHER PUBLICATIONS

Notice of allowance dated Mar. 12, 2014 for U.S. Appl. No. 13/202,877.

(Continued)

*Primary Examiner* — R. K. Arundale
(74) *Attorney, Agent, or Firm* — John Storella

(57) ABSTRACT

This invention provides a fluidic device comprising a diaphragm valve having a fluidics layer, an actuation layer and an elastic layer between the fluidics layer and the actuation layer, the elastic layer having a diaphragm that is mechanically sealed against the fluidics layer and the actuation layer by a sealing ring in the actuation layer.

31 Claims, 22 Drawing Sheets

(56) References Cited

U.S. PATENT DOCUMENTS

| | | | |
|---|---|---|---|
| 4,210,310 A | 7/1980 | Kay | |
| 4,723,131 A * | 2/1988 | Droit | B41J 2/04 118/313 |
| 5,589,136 A | 12/1996 | Northrup et al. | |
| 5,932,799 A | 8/1999 | Moles | |
| 6,153,389 A | 11/2000 | Haarer et al. | |
| 6,293,012 B1 * | 9/2001 | Moles | 29/890.124 |
| 6,412,751 B1 * | 7/2002 | Wang | F15C 5/00 251/331 |
| 6,461,492 B1 | 10/2002 | Hayashizaki et al. | |
| 6,489,112 B1 | 12/2002 | Hadd et al. | |
| 7,005,052 B2 | 2/2006 | Shimizu et al. | |
| 7,142,987 B2 | 11/2006 | Eggers | |
| 7,445,926 B2 * | 11/2008 | Mathies et al. | 435/288.5 |
| 7,584,240 B2 | 9/2009 | Eggers | |
| 7,589,184 B2 | 9/2009 | Hogan et al. | |
| 7,718,442 B2 | 5/2010 | Davis et al. | |
| 7,749,365 B2 | 7/2010 | Nguyen et al. | |
| 7,763,453 B2 | 7/2010 | Clemmens et al. | |
| 7,785,458 B2 | 8/2010 | Shimizu et al. | |
| 8,034,628 B2 | 10/2011 | Harrison et al. | |
| 8,062,612 B2 | 11/2011 | McAvoy et al. | |
| RE43,122 E | 1/2012 | Harrison et al. | |
| 8,142,635 B2 | 3/2012 | Shimizu et al. | |
| 8,256,465 B2 | 9/2012 | Christenson et al. | |
| 8,283,165 B2 | 10/2012 | Hogan et al. | |
| 8,376,317 B2 | 2/2013 | Chuang et al. | |
| 8,388,908 B2 | 3/2013 | Blaga et al. | |
| 8,394,642 B2 | 3/2013 | Jovanovich et al. | |
| 8,431,340 B2 | 4/2013 | Jovanovich et al. | |
| 8,431,384 B2 | 4/2013 | Hogan et al. | |
| 8,431,390 B2 | 4/2013 | Jovanovich et al. | |
| 8,476,063 B2 | 7/2013 | Jovanovich et al. | |
| 8,512,538 B2 | 8/2013 | Majlof et al. | |
| 8,551,714 B2 | 10/2013 | Jovanovich et al. | |
| 8,557,518 B2 | 10/2013 | Jovanovich et al. | |
| 8,562,918 B2 | 10/2013 | Jovanovich et al. | |
| 8,584,703 B2 | 11/2013 | Kobrin et al. | |
| 8,672,532 B2 | 3/2014 | Jovanovich et al. | |
| 8,748,165 B2 | 6/2014 | Vangbo et al. | |
| 8,763,642 B2 | 7/2014 | Vangbo | |
| 8,841,116 B2 | 9/2014 | Mathies et al. | |
| 8,894,946 B2 | 11/2014 | Nielsen et al. | |
| 9,012,236 B2 | 4/2015 | Jovanovich et al. | |
| 2003/0087425 A1 | 5/2003 | Eggers | |
| 2003/0087446 A1 | 5/2003 | Eggers | |
| 2003/0087455 A1 | 5/2003 | Eggers et al. | |
| 2003/0088657 A1 | 5/2003 | Eggers | |
| 2003/0129755 A1 | 7/2003 | Sadler et al. | |
| 2003/0146401 A1 * | 8/2003 | Wetzel | F15C 5/00 251/61.1 |
| 2003/0215369 A1 | 11/2003 | Eggers et al. | |
| 2004/0101966 A1 | 5/2004 | Davis et al. | |
| 2004/0219533 A1 | 11/2004 | Davis et al. | |
| 2005/0026181 A1 | 2/2005 | Davis et al. | |
| 2005/0042656 A1 | 2/2005 | Davis et al. | |
| 2006/0014177 A1 | 1/2006 | Hogan et al. | |
| 2007/0218485 A1 | 9/2007 | Davis et al. | |
| 2007/0237686 A1 * | 10/2007 | Mathies et al. | 422/103 |
| 2008/0241844 A1 | 10/2008 | Kellogg | |
| 2009/0020427 A1 | 1/2009 | Tan et al. | |
| 2009/0060797 A1 | 3/2009 | Mathies et al. | |
| 2010/0075858 A1 | 3/2010 | Davis et al. | |
| 2010/0092948 A1 | 4/2010 | Davis et al. | |
| 2010/0173392 A1 | 7/2010 | Davis et al. | |
| 2010/0178210 A1 | 7/2010 | Hogan et al. | |
| 2010/0209957 A1 | 8/2010 | Hogan et al. | |
| 2010/0218623 A1 | 9/2010 | Eggers et al. | |
| 2010/0248363 A1 | 9/2010 | Hogan et al. | |
| 2011/0008785 A1 | 1/2011 | Tan et al. | |
| 2011/0195495 A1 | 8/2011 | Selden et al. | |
| 2011/0229897 A1 | 9/2011 | Bell et al. | |
| 2011/0229898 A1 | 9/2011 | Bell et al. | |
| 2011/0240127 A1 | 10/2011 | Eberhart et al. | |
| 2011/0256530 A1 | 10/2011 | Hogan | |
| 2011/0290648 A1 | 12/2011 | Majlof et al. | |
| 2011/0312614 A1 | 12/2011 | Selden et al. | |
| 2012/0088249 A1 | 4/2012 | Jovanovich et al. | |
| 2012/0100522 A1 | 4/2012 | Saghbini et al. | |
| 2012/0115189 A1 | 5/2012 | Jovanovich et al. | |
| 2012/0164036 A1 | 6/2012 | Stern et al. | |
| 2012/0181460 A1 | 7/2012 | Eberhart et al. | |
| 2012/0267247 A1 | 10/2012 | Tan et al. | |
| 2012/0308987 A1 | 12/2012 | Hogan et al. | |
| 2012/0315635 A1 | 12/2012 | Vangbo et al. | |
| 2013/0029338 A1 | 1/2013 | Jovanovich et al. | |
| 2013/0053255 A1 | 2/2013 | Vangbo et al. | |
| 2013/0074944 A1 | 3/2013 | Van Gelder | |
| 2013/0084565 A1 | 4/2013 | Landers et al. | |
| 2013/0115607 A1 | 5/2013 | Nielsen et al. | |
| 2013/0139895 A1 | 6/2013 | Vangbo | |
| 2013/0210129 A1 | 8/2013 | Selden et al. | |
| 2013/0213810 A1 | 8/2013 | Tan et al. | |
| 2013/0217026 A1 | 8/2013 | Egan et al. | |
| 2013/0224846 A1 | 8/2013 | Jovanovich et al. | |
| 2013/0344475 A1 | 12/2013 | Jovanovich et al. | |
| 2014/0045704 A1 | 2/2014 | Jovanovich et al. | |
| 2014/0065628 A1 | 3/2014 | Van Gelder et al. | |
| 2014/0065689 A1 | 3/2014 | Hogan et al. | |
| 2014/0170645 A1 | 6/2014 | Jovanovich et al. | |
| 2014/0370519 A1 | 12/2014 | Vangbo et al. | |
| 2015/0021501 A1 * | 1/2015 | Ono et al. | 251/61 |
| 2015/0024436 A1 | 1/2015 | Eberhart et al. | |
| 2015/0136602 A1 | 5/2015 | Jovanovich et al. | |
| 2015/0136604 A1 | 5/2015 | Nielson et al. | |

OTHER PUBLICATIONS

Office action dated Jun. 26, 2013 for U.S. Appl. No. 13/202,877.
Office action dated Dec. 27, 2013 for U.S. Appl. No. 13/202,877.
US Unpublished U.S. Appl. No. 14/032,173, filed Sep. 10, 2013.
US Unpublished U.S. Appl. No. 14/320,384, filed Jun. 30, 2014.
US Unpublished U.S. Appl. No. 14/474,047, filed Aug. 29, 2014.
US Unpublished U.S. Appl. No. 14/500,846, filed Sep. 29, 2014.
US Unpublished U.S. Appl. No. 14/552,389, filed Nov. 24, 2014.
Co-pending U.S. Appl. No. 12/026,510, filed Feb. 5, 2008.
Co-pending U.S. Appl. No. 14/474,047, filed Aug. 29, 2014.
Co-pending U.S. Appl. No. 14/659,108, filed Mar. 16, 2015.

* cited by examiner

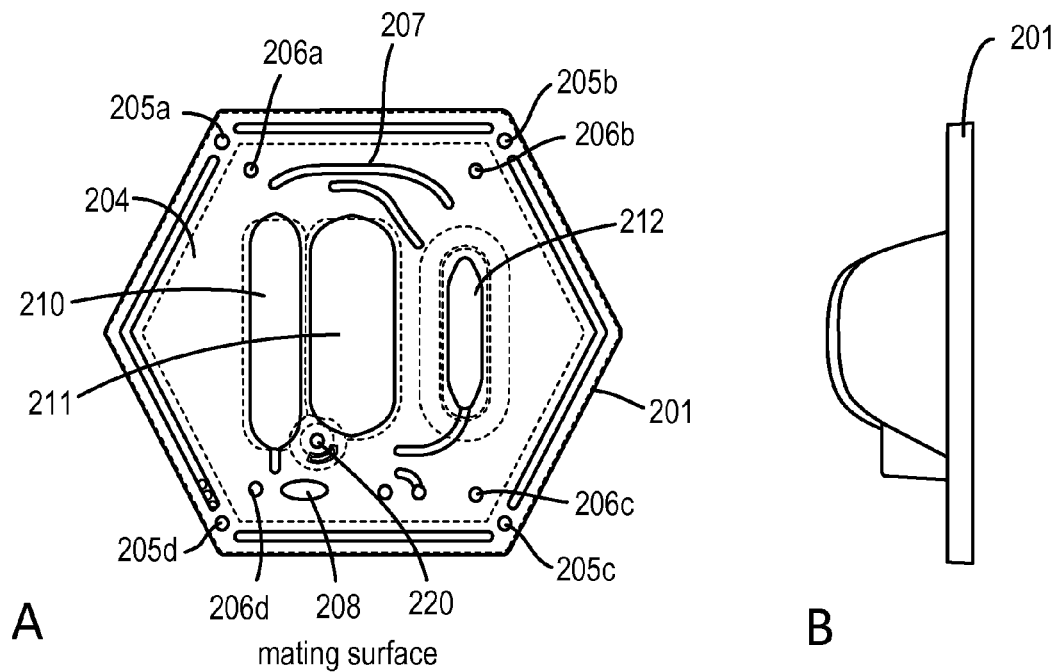
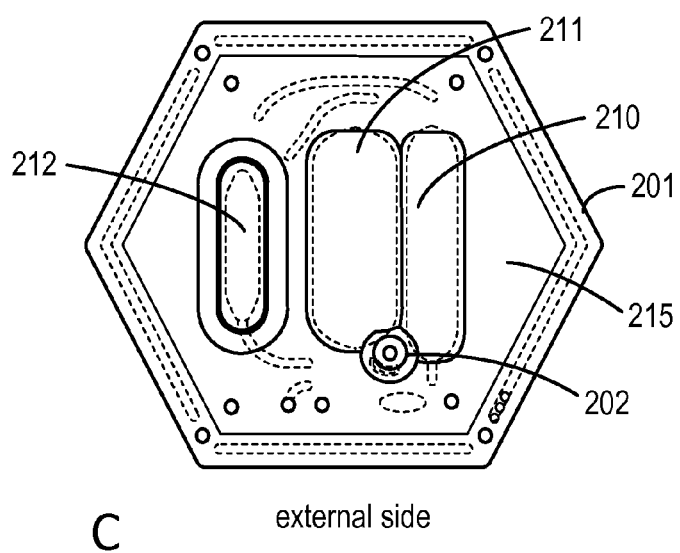
FIG. 2

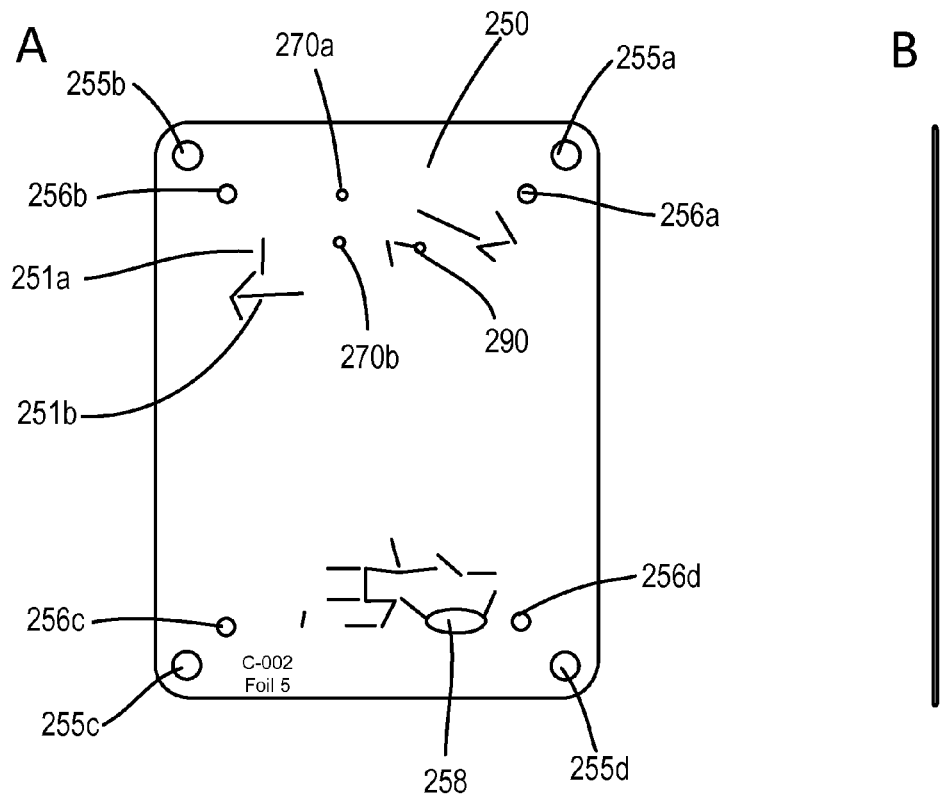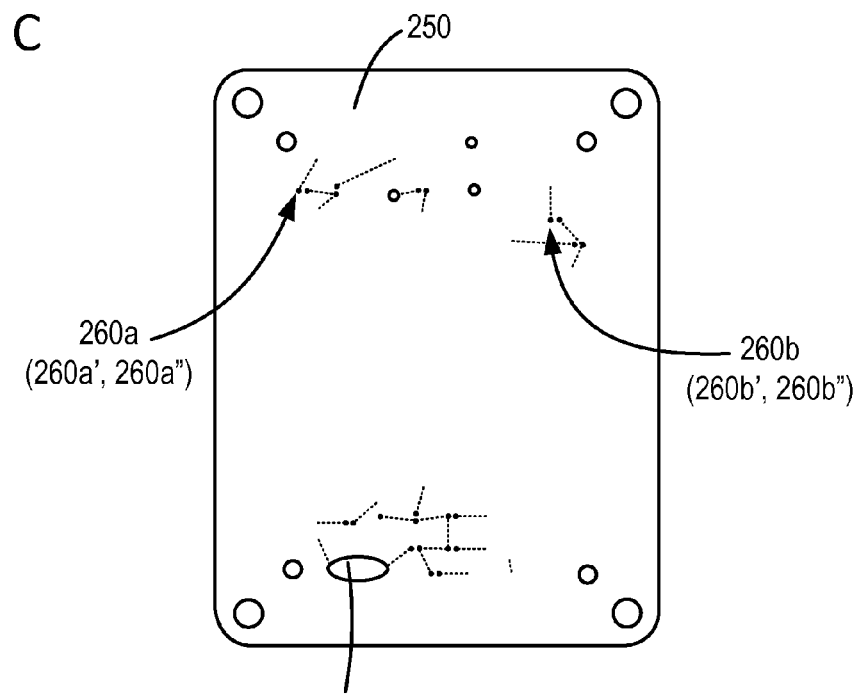
FIG. 3

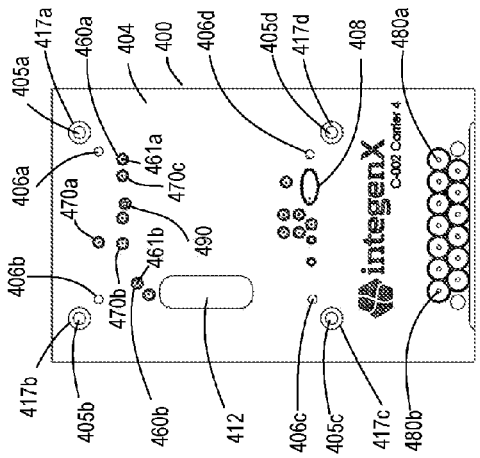
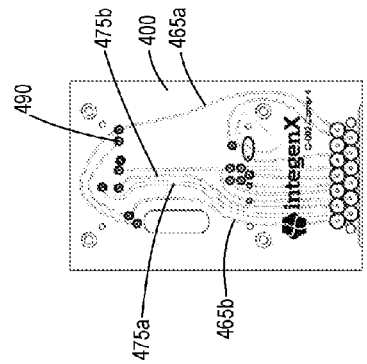
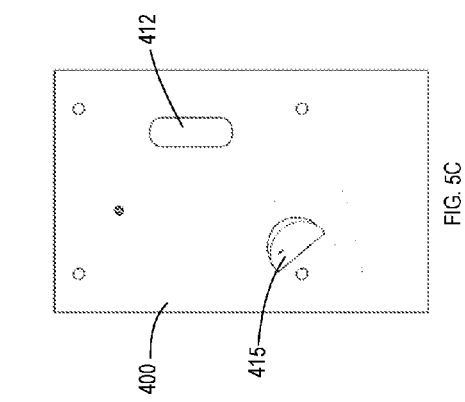

MICROFLUIDIC DEVICES WITH MECHANICALLY-SEALED DIAPHRAGM VALVES

CROSS-REFERENCE

This application is a Continuation application and claims priority to U.S. patent application Ser. No. 13/202,877, filed Sep. 19, 2011, now U.S. Pat. No. 8,763,642, which is a National Stage Entry of PCT application No. PCT/US2011/048527, filed Aug. 20, 2011, which claims priority to U.S. Provisional Patent Application Serial No. 61/375,791 filed Aug. 20, 2010, which is entirely incorporated herein by reference.

STATEMENT AS TO FEDERALLY SPONSORED RESEARCH

This invention was made with Government support under Contract No. W911 SR-06-C-0018 awarded by the Department of Defense. The Government has certain rights in the invention.

BACKGROUND OF THE INVENTION

Mathies et al. (U.S. Patent Publication 2004-0209354, Oct. 21, 2004) describes a microfluidic structure comprising: a first surface including a pneumatic channel; a second surface including a fluidic channel; and an elastomer membrane located between the first and second surfaces such that the application of a pressure or a vacuum to the pneumatic channel causes the membrane to deflect to modulate a flow of a fluid in the fluidic channel. Fluid flow in a fluidic conduit of such devices can be regulated by a diaphragm valve in the conduit that comprises a valve seat on which the elastomer membrane sits. When in contact with the seat, the elastomer membrane blocks fluid flow across a fluidic conduit. When out of contact with the seat, a passage exists that allows fluid communication across the valve. Mathies et al. indicates that the device can have surfaces of glass plastic or polymer.

Anderson et al. (Nucleic Acids Res. 2000 June 15:28(12): E60) describes a plastic device held together using ultrasonic welding or adhesives.

Jovanovich et al. (U.S. Patent Publication 2005/0161669, Jul. 28, 2005) describes reducing macroscale sample solutions to microscale volumes, for example by concentrating milliliters to microliters or smaller volumes for introduction into one or more microfluidic devices. The document describes embodiments capable of acting as modular scale interfaces, permitting microscale and/or nanoscale devices to be integrated into fluidic systems that comprise operational modules that operate at larger scale.

Jovanovich et al. (WO 2008/115626, Sep. 25, 2008) describes microfluidic chips made from plastic components. The document also describes integration of macroscale devices such as automation and robotics with nanoscale sample preparation and analysis.

SUMMARY OF THE INVENTION

An aspect of the invention provides fluidic devices. In an aspect of the invention, a microfluidic device comprises one or more pneumatically-actuated valves operably coupled to an actuator, wherein each of the pneumatically-actuated valves is operable for at least about 90% of actuations performed on the valve by the actuator.

In another aspect of the invention, a microfluidic device comprises one or more pneumatically-actuated valves operably coupled to an actuator, wherein an individual valve of the pneumatically-actuated valves is movable from a first position to a second position with the aid of actuation, and wherein following termination of actuation the individual valve remains in the second position less than about 10% of actuation times.

In another aspect of the invention, a microfluidic device comprises one or more pneumatically-actuated valves operably coupled to an actuator, the one or more pneumatically actuated valves having a via layer and an elastic layer adjacent the actuator, wherein the elastic layer is movable from a first position to a second position with the aid of actuation from the actuator, and wherein the elastic layer has a failure rate less than about 10%.

In another aspect of the invention, a microfluidic lot of microfluidic devices comprises at least 10, 100 or 500 microfluidic cartridges, an individual cartridge of the microfluidic cartridges comprising one or more pneumatically actuated valves, an individual valve of the pneumatically actuated valves operably coupled to an actuator, wherein the microfluidic lot has a failure rate of at least about 10% per 100 consecutive actuations.

In another aspect of the invention, a device comprises at least one diaphragm valve comprised in a combination that comprises a fluidics layer, an actuation layer and an elastic layer sandwiched between the fluidics layer and the actuation layer, wherein the diaphragm in each diaphragm valve is comprised in the elastic layer and is mechanically (e.g., pressure) sealed against the fluidics layer and against the actuation layer by a raised sealing ring in the actuation layer. In one embodiment the at least one diaphragm valve is a plurality of diaphragm valves. In another embodiment each diaphragm valve comprises: a) a valve seat against which the diaphragm is configured to sit; b) a valve relief defined at least in part by the sealing ring, into which the diaphragm is configured to be deflected thereby defining a valve chamber; c) a valve inlet and a valve outlet comprised in the fluidics layer and in fluid communication with the valve chamber; and wherein the diaphragm is configured to be actuated by positive or negative pressure transmitted through an actuation conduit in the actuation layer that communicates with the valve relief. In another embodiment the fluidics layer comprises a via layer and a fluidics manifold, wherein the via layer has a first face mated with the elastic layer and a second face mated with a fluidics manifold, wherein the valve inlet and valve outlet of each diaphragm valve are configured as vias through the via layer and each via is in fluidic communication with a microfluidic channel in the fluidics layer; and wherein the fluidics manifold comprises at least one compartment scaled by the second face of the via layer, wherein at least one macrofluidic chamber is in fluid communication with a microfluidic channel communicating with a via. In another embodiment the microfluidic channel is disposed in the second face of the via layer. In another embodiment the microfluidic channel is disposed in the fluidics manifold. In another embodiment the fluidics manifold comprises a conduit in communication with at least one of the macrofluidic compartments and with a microfluidic channel in the second face of the via layer or with a via. In another embodiment the via layer is adhered to the fluidics manifold with an adhesive. In another embodiment the via layer is comprised of a flexible material. In another embodiment the via layer has a thickness of no more than 0.5 mm. In another embodiment the fluidics manifold comprises a second compartment that opens toward the via layer and the via layer comprises an aperture exposing the second compartment to the elastic layer. In another embodiment the fluidics manifold and/or the actuation layer comprises a polymer selected from poly(acrylonitrile butadiene styrene) ("ABS"), acrylic, acetal, rubber, nylon, polycarbonate, polyether, polyester, polyurethane, polypropylene, polyolefin, cycloolefin, and co-polymers or filled versions thereof In another embodiment the fluidics manifold and/or the actuation layer are comprised of a rigid material. In another embodiment the compartment is a macrofluidic compartment. In another embodiment the compartment has a volume between 10 microliters and 20 milliliters. In another embodiment the elastic layer comprises a urethane, a nitrile, a latex or silicone (e.g., polydimethylsiloxane, also "PDMS" herein). In another embodiment at least one actuation conduit is configured to transmit positive or negative pressure to a plurality of diaphragm valves. In another embodiment at least one actuation conduit is configured to transmit positive or negative pressure to a fluidic conduit. In another embodiment at least one actuation conduit traverses the actuation layer from a first face to a second face, the second face opposing the first face. In another embodiment the actuation layer comprises an aperture configured to transmit heat to a chamber in the fluidics layer. In another embodiment a mechanical fastener configured to fasten the combination into a sandwich transmits pressure to the pressure seal. In another embodiment the mechanical fastener is selected from a screw, a clip, a snap, a staple, a rivet, a band and a pin. In another embodiment the fluidics manifold, the via layer and the actuation layer comprise guide holes configured to receive a mechanical fastener that is configured to hold the layers of the device together and apply a sealing pressure from the pressure rings against the elastic layer. In another embodiment the actuation layer comprises raised standoffs that set a distance between a surface of the actuation layer and the elastic layer in an assembled device.

In another aspect this invention provides a system comprising: a) a device comprising at least one diaphragm valve comprised in a combination that comprises a fluidics layer, an actuation layer and an elastic layer sandwiched between the fluidics layer and the actuation layer, wherein the diaphragm in each diaphragm valve is comprised in the elastic layer and is mechanically sealed against the fluidics layer and against the actuation layer by a raised sealing ring in the actuation layer; wherein each diaphragm valve comprises: i) a valve seat against which the diaphragm is configured to sit; ii) a valve relief defined at least in part by the sealing ring, into which the diaphragm is configured to be deflected thereby defining a valve chamber; iii) a valve inlet and a valve outlet comprised in the fluidics layer and in fluid communication with the valve chamber; and wherein the diaphragm is configured to be actuated by positive or negative pressure transmitted through an actuation conduit in the actuation layer that communicates with the valve relief; b) a source of positive and/or negative pressure in communication with the actuation conduits and c) a control unit comprising logic to open and/or close valves in a programmed sequence. In one embodiment the system further comprises: d) a magnet assembly configured to deliver a regulatable magnetic field to a chamber in the fluidic manifold. In another embodiment the system further comprises d) a thermal control assembly configured to regulate temperature in a chamber in the fluidic manifold.

Another aspect of the invention provides a fluidics device comprising at least one diaphragm valve, said at least one diaphragm valve comprising a via layer and an actuation layer separated by an elastic layer, said via layer having a first via adjacent a second via, said first via separated from said second via by a first width, said actuation layer having a raised sealing member in contact with said elastic layer, said sealing member having a second width that is greater than said first width.

Another aspect of the invention provides a fluidics device comprising at least one diaphragm valve, said at least one diaphragm valve comprising a via layer and an actuation layer separated by an elastic layer, the via layer having a first via adjacent a second via, the actuation layer having a raised sealing member for bringing at least a portion of the elastic layer in contact with the via layer, the sealing member having a dimension (D1) that is greater than a center-to-center dimension (D2) of the first via and second via.

Another aspect of the invention provides a fluidics device having one or more pneumatically actuated valves, an individual valve of said one or more pneumatically actuated valves having a fluidics layer that is independent of an actuation layer of said individual valve, wherein said individual valve leaks upon at most 1 actuation out of 100 actuations of said actuation layer. In an embodiment, the individual valve leaks upon at most 1 actuation out of 1000 actuations. In another embodiment, the individual valve leaks upon at most 1 actuation out of 10,000 actuations. In another embodiment, the individual valve leaks upon at most 1 actuation out of 100,000 actuations.

Another aspect of the invention provides a fluidics device comprising at least one diaphragm valve, said at least one diaphragm valve comprising a fluidics layer having a fluidics manifold adjacent a via layer, wherein the fluidics manifold comprises one or more macrofluidics chambers or channels, wherein the via layer comprises one or more microfluidic chambers or channels in fluid communication with said one or more macrofluidics chambers or channels. In an embodiment, the via layer comprises one or more vias extending from a first surface adjacent the fluidics manifold to a second surface opposite from the first surface.

In another aspect this invention provides a method comprising: a) providing a device comprising at least one diaphragm valve comprised in a combination that comprises a fluidics layer, an actuation layer and an elastic layer sandwiched between the fluidics layer and the actuation layer, wherein the diaphragm in each diaphragm valve is comprised in the elastic layer and is mechanically sealed against the fluidics layer and against the actuation layer by a raised sealing ring in the actuation layer; and further comprising two compartments in the fluidics manifold fluidically connected to each other through one of the diaphragm valves; b) opening the diaphragm valve; and c) moving liquid through the valve from one compartment to another.

In another aspect this invention provides a method comprising: a) providing a system of this invention that comprises a magnet assembly configured to deliver a regulatable magnetic field to a chamber in the fluidic manifold; b) moving magnetically responsive particles into the compartment; and c) capturing the particles in the compartment using the magnetic force.

Another aspect of the invention provides methods for regulating fluid flow. In an embodiment, a method for regulating the flow of fluid comprises providing a microfluidic device comprising one or more pneumatically-actuated valves operably coupled to an actuator, wherein an individual valve of the pneumatically-actuated valves is movable from a first position to a second position with the aid of actuation; and actuating the individual valve. Following termination of actuation, the individual valve remains in the second position less than about 10% of actuation times.

In another embodiment, a method for regulating the flow of fluid comprises providing a microfluidic device, comprising one or more pneumatically-actuated valves operably coupled to an actuator, the one or more pneumatically actuated valves having a via layer and an elastic layer adjacent the actuator, wherein the elastic layer is movable from a first position to a second position with the aid of actuation from the actuator; and actuating, with the aid of the actuator, the elastic layer. The elastic layer has a failure rate less than about 10%.

In another aspect of the invention, a method for manufacturing a fluidics device comprises a) providing a via layer, an actuation layer and an elastic layer disposed between the via layer and the actuation layer, said actuation layer having a raised sealing member adjacent the elastic layer, said via layer having one or more vias and in some cases one or more fluid channels (also "channels" herein) in fluid communication with at least some of said one or more vias; and b) mechanically sealing the via layer, actuation layer and the elastic layer against one another to form the fluidics device. In an embodiment, the via layer, actuation layer and the elastic layer are mechanically sealed within a time period of 30 minutes or less to yield the fluidics device configured to flow a fluid through the one or more vias at a flow rate of at least about 50 nanoliters (nL)/second. In another embodiment, the via layer, actuation layer and the elastic layer are mechanically sealed within a time period of 10 minutes or less to yield the fluidics device configured to flow a fluid through the one or more vias at a flow rate of at least about 50 nL/s. In another embodiment, the via layer, actuation layer and the elastic layer are mechanically sealed within a time period of 1 minute or less to yield the fluidics device configured to flow a fluid through the one or more vias at a flow rate of at least about 50 nL/s.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications and patent applications mentioned in this specification are herein incorporated by reference to the same extent as if each individual publication or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

FIG. 2 shows an example of a fluidics manifold. FIG. 2A shows a mating face. FIG. 2B shows a side view. FIG. 2C shows an external side.

FIG. 3 shows an example of a via layer. FIG. 3A shows a first surface. FIG. 3B shows a side view. FIG. 3C shows a second surface.

FIG. 4 shows an example of an elastic layer.

FIG. 5 shows an example of an actuation layer. FIG. 5A shows a mating face. FIG. 5B shows a mating surface with internal conduits visible. FIG. 5C shows an external side.

DETAILED DESCRIPTION OF THE INVENTION

1. Introduction

Figure 1:
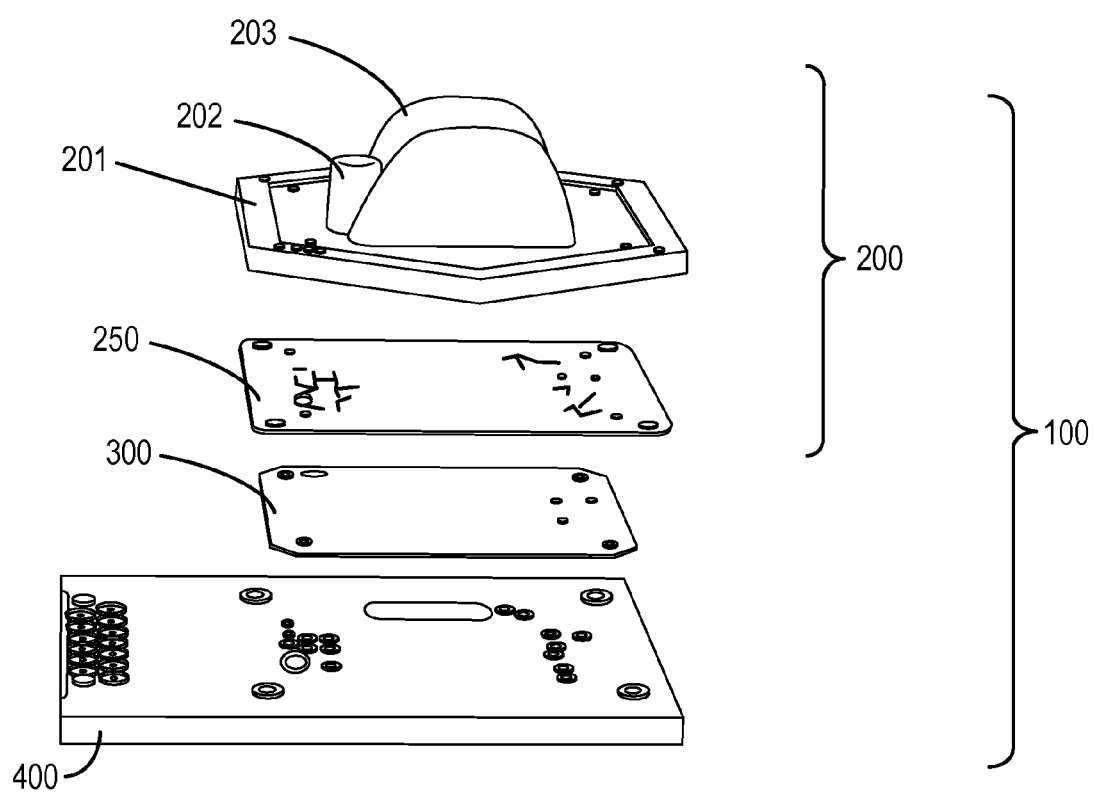
FIG. 1 shows an exploded view of a fluidic device of this invention.

Unless defined otherwise, all technical and scientific terms used herein have the same meaning as commonly understood by one of ordinary skill in the art to which the invention pertains. Although many methods and materials similar, modified, or equivalent to those described herein can be used in the practice of the present invention without undue experimentation, the preferred materials and methods are described herein. In describing and claiming the present invention, the following terminology will be used in accordance with the definitions set out below.

The term "mesoscale," as used herein, refers to a dimension greater than or equal to $1 \times 10^{-3}$ m. Mesoscale channels can have, e.g., a diameter, width and/or thickness in the mesoscale range.

The term "microscale," as used herein, refers to a dimension greater than or equal to $1 \times 10^{-6}$ m (micrometer) and less than $1 \times 10^{-3}$ m. Microchannels can have, e.g., a diameter, width and/or thickness in the microscale range.

The term "nanoscale," as used herein, refers to a dimension less than $1 \times 10^{-6}$ m. Nanoscale channels can have, e.g., a diameter, width and/or thickness in the nanoscale range.

The term "via," as used herein, refers to an orifice or channel extending through at least a portion of a device layer. A via in some cases extends from a first surface of a device layer to a second surface of the device layer, the second surface opposite from the first surface.

A diaphragm valve uses a diaphragm to open or close a fluidic path between fluidic conduits. A diaphragm valve typically comprises a valve body having a valve inlet and a valve outlet that communicate with the fluidic conduits entering and exiting the valve. The diaphragm valve closes when the diaphragm sits against a valve seat, thereby preventing fluid flow between the valve inlet and the valve outlet. When the diaphragm is off the valve seat, it creates a fluidic chamber or passage through which fluid may flow. A fluidic conduit is then in fluid communication with the valve chamber through the valve ports. The valve may be configured so that under ambient conditions (i.e., no external application of positive or negative pressure) the diaphragm naturally sits on the valve seat, thus closing the valve, and is deformed away from the seat to open the valve by application of positive or negative pressure relative to ambient (a so-called "normally closed" valve). The valve also may be configured so that under ambient conditions (i.e., no external application of positive or negative pressure) the diaphragm naturally does not sit on the scat and is deformed toward the scat to close the valve by application of positive or negative pressure relative to ambient (a so-called "normally open" valve). In this case, application of positive pressure to the elastic layer from the actuation conduit will push the elastic layer onto the valve seat, closing the valve. Thus, the diaphragm is in operative proximity to the valve seat and configured to be actuatable to contact the valve seat or to be out of contact with the valve seat.

This invention provides fluidic devices, e.g., microfluidic devices, having at least one and, typically, a plurality of fluidic paths, e.g., microfluidic paths, in which fluid flow along a fluidic path is regulated by one or more diaphragm valves. In some situations, devices arc provided having three functional layers: a fluidics layer, an actuation layer and an elastic layer (i.e., a layer formed of an elastic material, such as an elastomer) sandwiched between them. The fluidics layer comprises at least one and, typically, a plurality of fluidic conduits through which fluid flows. The elastic layer sandwiched between the fluidics layer and the actuation layer is configured to provide diaphragms for the diaphragm valves. The actuation layer comprises at least one and, typically, a plurality of actuation conduits that actuate the elastic diaphragms. The layers typically have effacing surfaces on which many diaphragm valves can be introduced. Typically, the elastic layer is formed of a flat sheet, e.g., a sheet that is not sculpted. In some embodiments, the functional layers of the fluidic devices are held together by a mechanical seal, such as a pressure seal. In an example, the mechanical seal is a screw. In another example, the mechanical seal is a clamp. In another example, the mechanical seal is an adhesive.

In some embodiments, valves are formed by functional elements in three parts. A valve inlet and a valve outlet comprise openings on the surface of the fluidics layer facing the elastic layer. The valve inlet and valve outlet communicate with fluidic conduits in the fluidics layer to form a fluidic path. The portion of the surface of the fluidics layer between the valve inlet in the valve outlet interrupts a fluidic conduit and can function as a valve seat. The elastic layer functions as a diaphragm. When it contacts the fluidics layer, the diaphragm sits on the valve scat, closing the valve. The actuation layer comprises raised rings or ridges. When facing the fluidics layer, these raised rings are configured to surround a valve inlet and a valve outlet. Because the rings are raised against the surface of the actuation layer, they define a valve relief into which the diaphragm can be deflected. Actuation conduits communicate with the valve relief thereby providing a path through which positive or negative pressure can be transmitted to deflect the diaphragm toward or away from the valve seat.

Figure 11:
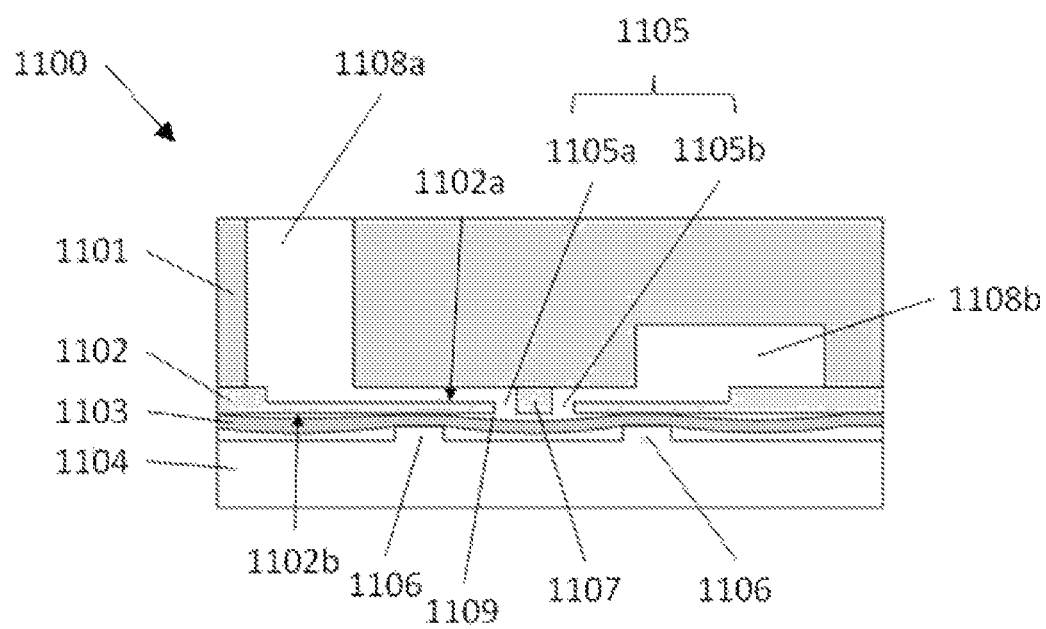
FIG. 11 shows a valve, in accordance with an embodiment of the invention.

FIG. 11 shows a valve 1100, in accordance with an embodiment of the invention. The valve 1100 includes a fluidics manifold 1101, a via layer 1102 adjacent the fluidics manifold 1101, an elastic layer 1103 adjacent the via layer 1102, and an actuation layer 1104 adjacent the elastic layer 1103. The via layer 1102 has a first surface 1102a and a second surface 1102b. The via layer 1102 includes one or more vias. In the illustrated example, the via layer 1102 includes vias 1105, which are openings through the via layer 1102. The vias 1105 include a first via 1105a and a second via 1105b. The first via 1105a and the second via 1105b each traverse the via layer, extending from the first surface 1102a to the second surface 1102b. The actuation layer 1104 includes ridges 1106 that are configured to hold portions of the elastic layer 1103 against the second surface 1102b of the via layer 1102. In some cases, the ridges 106 are part of a ring-like or other symmetrical structure. The fluidics manifold 1101 includes chambers and/or channels, such as a first chamber 1108a and a second chamber 1108b. The via layer 1102 includes a ridge (or sealing member) 1107 that is configured to form a seal with the elastic layer 1103. The ridge 1107 can be referred to as a valve seat in some cases. The actuation layer 1104 is configured to provide force or pressure (positive or negative pressure) to the elastic layer 1103.

The elastic layer 1103 is formed of a deformable material, such as a polymeric material (e.g., elastomer). The elastic layer 1103 is configured to at least partially deform upon the application of actuation force from the actuation layer 1104.

The vias 1105 enable a fluid to move from the first chamber 1108a to the second chamber through a channel defined by the ridge 1107 and the elastic layer 1103. In some cases, the valve 1100 is a normally-closed valve. In such a case, in the absence of actuation pressure from the actuation layer 1104, the elastic layer 1103 is flush against the ridge 1107, thereby sealing a channel between the vias 1105. Upon the application of actuation pressure from the actuation layer 1104 to the elastic layer 1103, a portion of the elastic layer 1103 moves away from the ridge 1107 to open the channel between the vias 1105. Fluid may then flow from the first chamber 1108a to the second chamber 1108b (or vice versa) through the vias 1105. Alternative, the valve 1100 may be a normally-open valve. In such a case, in the absence of actuation pressure from the actuation layer 1104, the elastic layer 1103 is not in contact with the ridge 1107 and the channel between the vias 1105 is open. Upon the application of actuation pressure from the actuation layer 1104 to the elastic layer 1103, a portion of the elastic layer 1103 comes in contact with the ridge 1107, thereby closing the channel between the vias 1105.

The actuation layer 1103 provides actuation pressure (or force) between the ridges 1106. In some cases, the actuation pressure is a vacuum and the actuation layer 1104 provides a vacuum between the ridges 1106. In other cases, the actuation pressure is positive pressure and the actuation layer 1104 provides positive pressure between the ridges 1106, which causes the elastic layer 1103 to deform upward.

With continued reference to FIG. 11, the vias 1105a and 1105b may be in fluid communication with one or more channels formed in the via layer 1102. In an example, the first via 1105a is in fluid communication with a channel formed in the first surface 1102a. The channel may be angularly disposed in relation to the first via 1105a, such as disposed at an angle of about 90° in relation to the first via 1105a. The channel may bring the first via 1105a in fluid communication with another via or a chamber or channel of the fluidics manifold 1101.

The ridges 1106 are comprised in a sealing member in the actuation layer 1104. The ridges are separated from one another by a distance (D1, see also FIG. 15C) that in some cases is greater than a distance (D2) between the centers of the vias 1105a and 1105b—i.e., D1>D2. In other cases, D1 can be equal to D2 (i.e., D1=D2).

A portion of the elastic layer 1103 comes in contact with the via layer 1102. The elastic layer in some cases is not in contact with the ridge 1107, in which case a passage between the elastic layer 1103 and the ridge 1107 permits fluid flow between the first chamber 1108a and second chamber 1108b. With the elastic layer 1103 not contacting the ridge 1107, the via layer 1102 comprises a ridge 1109, which may be a symmetrical ridge (i.e., having an opposing, mirror ridge, as shown). In some cases, the ridge 1109 is formed in cases in which D1>D2.

The raised rings also serve a function of creating a pressure seal for the diaphragm valves. More specifically, when the three functional layers are squeezed together, the raised ridges focus pressure against the elastic layer and onto the actuation layer. This inhibits fluid from leaking out of the valve and between the functional layers. The pressure can be applied mechanically. In this case, it may not be necessary to bond the elastic layer with either the fluidics layer or the actuation layer.

Alternatively, the valve can be normally open. In this case, application of positive pressure to the elastic layer from the actuation conduit will push the elastic layer onto the valve seat, closing the valve. This embodiment can be made by, for example, making the surface of the valve seat recessed with respect to the surface of the fluidics layer bonded to the elastic layer. In this case, the valve seat will be raised with respect to the elastic layer. Positive pressure on the elastic layer pushes the elastic layer against the valve seat, closing the valve.

By controlling a solenoid, vacuum or pressure (e.g., approximately one-half atmosphere) can be applied to the diaphragm to open or close the valve by simple deformation of the flexible membrane, e.g., application of vacuum to the membrane deflects the membrane away from a valve seat, thereby opening the valve.

Diaphragm valves of this invention can displace defined volumes of liquid. A diaphragm valve can displace a defined volume of liquid when the valve is moved into a closed or opened position. For example, a fluid contained within a diaphragm valve when the valve is opened is moved out of the diaphragm valve when the valve is closed. The fluid can be moved into a microchannel, a chamber, or other structure. The diaphragm valve can displace volumes that are about, up to about, less than about, or greater than about any of 500, 400, 300, 200, 100, 50, 25, 20, 15, 10, 5, 4, 3, 2, 1, 0.5, 0.25, 0.1, 0.05 or 0.01 µL.

Variations on flow-through and in-line valves can include valves that are situated at intersections of greater than two, three, four, or more channels. Valve seats or other structures can be designed such that closure of the valve can prevent or reduce flow in one or more of the channels while allowing fluid to flow in one or more of the other channels. For example flow can be blocked along three of five channels, while flow can continue through two of the five channels. A flow-through valve can also be referred to as a T-valve, as described in WO 2008/115626.

Fluid can be moved through valves by exertion of exogenous pressure on the fluid in the fluidic conduits or by using on-board diaphragm pumps.

When three diaphragm valves are placed in a series a positive displacement pump is created. The series can comprise a first diaphragm valve with a valve seat, a pumping diaphragm valve without a valve seat and a second diaphragm valve with a valve seat. Positive displacement diaphragm pumps are self-priming and can be made by coordinating the operation of the three valves (including but not limited to any of 2, 3, 4, 5, 6, 7, 8, 9, 10, 11, 12, 13, 14, 15, 16, 17, 18, 19, or 20 or more valves), and can create flow in either direction. A variety of flow rates can be achieved by the timing of the actuation sequence, diaphragm size, altering channel widths, and other on-device dimensions. Routers can similarly be formed from these valves and pumps. The routers can be formed using two or more valves each on a separate channel connecting to central diaphragm valve. A router also can be made by configuring three channels, each comprising a diaphragm pump, to meet in a common chamber, e.g., a pumping chamber. Bus structures can also be created that employ a series of at least two flow-through valves in which intersecting channels intersect the same flow-through channel.

To operate a three-part diaphragm pump, a first valve is opened and a third valve is closed. Then, a second, or middle, valve is opened, drawing liquid through the first valve and into the chamber of the second valve. Then, the first valve is closed, the third valve is opened. Then, the second valve is closed, pumping liquid in the chamber through the third valve. For example, moving the diaphragm into the valve relief creates an intake stroke that pulls fluid into the valve chamber when the valve inlet is open and the valve outlet is closed. Then, moving the diaphragm toward the valve seat creates a pump stroke that pushes the fluid out of the valve chamber when the valve inlet is closed and the valve outlet is open.

In some embodiments, microfluidic devices are monolithic devices. In monolithic devices, a plurality of circuits are provided on a single substrate. In the case of devices comprising diaphragm valves, a monolithic device comprises a single elastic layer functioning as a diaphragm for a plurality of valves. In certain embodiments, one actuation channel can operate a plurality of valves on a monolithic device. This allows parallel activation of many fluidic circuits. Monolithic devices can have dense arrays of microfluidic circuits. These circuits function with high reliability, in part because the channels in each circuit are fabricated simultaneously on a single substrate, rather than being made independently and assembled together. In other embodiments, an actuation conduit can control actuation of a single valve. For example, the actuation conduit can traverse the actuation layer from the actuation surface to the other side.

In some embodiments, fluidic devices comprise one or more microfluidic channels. A microfluidic channel has at least one cross sectional dimension no greater than 500 microns, no greater than 400 microns, no greater than 300 microns, or no greater than 250 microns, e.g., between 1 micron and 500 microns. A macrofluidic channel has at least one cross sectional dimension greater than 500 microns. A non-microfluidic volume as used herein refers to a volume of at least 5 microliters, at least 10 microliters, at least 100 microliters and least 250 microliters, at least 500 microliters, at least 1 milliliter, or at least 10 milliliters.

The diaphragm valves, pumps, and routers are durable, easily fabricated at low cost, can operate in dense arrays, and have low dead volumes. Arrays of diaphragm valves, pumps, and routers are readily fabricated on substrates. In one embodiment, all the diaphragm valves, pumps, and routers on a microchip are created at the same time in a simple manufacturing process using a single or monolithic membrane, such as a sheet of an elastic material. The cost is similar to make five diaphragm pumps on a device as to create five hundred. This technology provides the ability to create complex meso-, micro- and nanofluidic circuits on microchips and integrate chemical and biochemical processes by using the circuits. Thus, the disclosure herein provides methods and the ability to create simple and complex meso-, micro-, nano-, and pico-fluidic circuits on devices, and allows the implementation of virtually any reaction or assay onto a device. In general, this technology can be at least substantially insensitive to variations in solution ionic strength and surface contamination, and does not require applied electric fields. In some situations, the technology, including various devices and methods, may be used in processed with wide temperature ranges, a variety of different solvents, and over a relatively long length of time.

A device typically will comprise a plurality of fluidics circuits, each circuit comprising a microfluidic conduit in communication with external entry and exit ports. Circuits typically comprise channels and functional elements, such as valves, routers, pumps (e.g., three independently operable valves in series) and chambers.

The fluidic circuits and actuation circuits of these devices can be densely packed. A circuit comprises an open or closed conduit. In certain embodiments, the device can comprise at least 1 fluidic circuit per 1000 mm$^2$, at least 2 fluidic circuits per 1000 mm$^2$, at least 5 fluidic circuits per 1000 mm$^2$, at least 10 fluidic circuits per 1000 mm$^2$, at least 20 fluidic circuits per 1000 mm$^2$, at least 50 fluidic circuits per 1000 mm$^2$. Alternatively, the device can comprise at least 1 mm of channel length per 10 mm$^2$ area, at least 5 mm channel length per 10 mm$^2$, at least 10 mm of channel length per 10 mm$^2$ or at least 20 mm channel length per 10 mm$^2$. Alternatively, the device can comprise valves at a density of at least 1 valve per cm$^2$, at least 4 valves per cm$^2$, or at least 10 valves per cm$^2$, or at least 50 valves per cm$^2$. A valve in such a case may be a seated valve (i.e., a valve having a valve seat). Alternatively, the device can comprise features, such as channels, that are no more than 5 mm apart (edge-to-edge), no more than 2 mm apart, no more than 1 mm apart, no more than 500 microns apart or no more than 250 microns apart.

In other embodiments, the device can comprise at most 1 fluidic circuit per 1000 mm$^2$, at most 2 fluidic circuits per 1000 mm$^2$, at most 5 fluidic circuits per 1000 mm$^2$, at most 10 fluidic circuits per 1000 mm$^2$, at most 20 fluidic circuits per 1000 mm$^2$, at most 50 fluidic circuits per 1000 mm$^2$. Alternatively, the device can comprise at most 1 mm of conduit length per 10 mm$^2$ area, at most 5 mm conduit length per 10 mm$^2$, at most 10 mm of conduit length per 10 mm$^2$ or at most 20 mm conduit length per 10 mm$^2$. Alternatively, the device can comprise valves at a density of at most 1 valves per cm$^2$, at most 4 valves per cm$^2$, or at most 10 valves per cm$^2$, or at least 50 valves per cm$^2$. A valve in such a case may be a seated valve (i.e., a valve having a valve seat). Alternatively, the device can comprise features, such as channels, that are no less than 5 mm apart edge-to-edge, no less than 2 mm apart, no less than 1 mm apart, no less than 500 microns apart or no less than 100 microns apart.

The devices of this invention have very low failure rates. A device is considered to fail when at least one fluidic circuit fails to perform. Failure can result from several sources. These include delamination of the sandwich, for example from deformation of the parts; from sticking of the elastic layer to functional portions of the fluidics or elastic layers, such as sticking to a valve seat, valve chamber or channel surfaces that is exposed to the elastic layer; or poor control of the laser cutting, resulting in, e.g., residue material blocking channels or valves.

The devices of this invention can perform more high reliability. A batch of devices according to this invention have failure rates of less than 20%, less than 10%, less than 1% or less than 0.1%. Valves of this invention can have a failure rate of less than 1% over 1,000 actuations, 10,000 actuations or 100,000 actuations. A batch can be at least 10, at least 50 or at least 100 devices.

Some embodiments provide a microfluidic devices comprising one or more pneumatically actuated valves having low or substantially low failure rates. In some cases, an individual valve of said pneumatically actuated valves has a valve seat. Upon actuation of the individual valve and following termination of actuation, the individual valve remains in its actuated position (and thus has a failure rate) less than about 10% of actuation times, or less than about 1% of actuation times, or less than about 0.1% of actuation times, or less than about 0.01% of actuation times, or less than about 0.001% of actuation times, or less. In some embodiments, the individual valve comprises at least 1 elastic layer, or at least 2 elastic layers, or at least 3 elastic layers. In other embodiments, the individual valve comprises at least 2 layers, or at least 3 layers, or at least 4 layers.

Other embodiments provide a microfluidic device comprising one or more pneumatically-actuated valves operably coupled to an actuator, wherein each of said pneumatically-actuated valves is operable for at least about 70%, or 75%, or 80%, or 85%, or 90%, or 95%, or 99%, or 99.9%, or 99.99%, or 99.999%, or 99.9999% of actuations performed on the valve by said actuator, wherein the actuations comprise at least 10, 100, 200, 500, 700, or 1000 actuations, sequential actuations, or sequential actuations first performed by the valve/device. In any of the embodiments herein, each of the pneumatically-actuated valves comprises at least 1 elastic layer, or at least 2 elastic layers, or at least 3 elastic layers (for example, in some instances a valve comprises an elastomeric layer/diaphragm and an elastomeric via layer). In any of the embodiments herein, each of the pneumatically-actuated valves comprises at least 2 layers, or at least 3 layers, or at least 4 layers. For example, a pneumatically-actuated valve can comprise of a pneumatic layer, a via layer and an elastic layer located between said via layer and pneumatic layer. As another example, a pneumatically-actuated valve can comprise of a pneumatic layer, a via layer and an elastic layer located between said via layer and pneumatic layer, and a fluidics manifold (also "fluidics manifold layer" herein) adjacent the via layer.

In an example, the individual valve comprises an elastic layer adjacent to a via layer. The via layer comprises at least one channel directed through the via layer from a first surface of the via layer to a second surface of the via layer, the second surface opposite from the first surface. The via layer may include at least one channel formed in the first surface. The at least one channel is in fluid communication with the via. In some cases, the via is in fluid communication with an additional channel formed in the first surface or the second surface.

The individual valve may be in a normally open or normally closed configuration. In a normally open configuration, the valve is open in the absence of pneumatic actuation (also "actuation" herein), such as actuation with the aid or positive pressure or negative pressure (or vacuum). In a normally closed configuration, the valve will be opened upon actuation. In a normally open configuration, the valve will be closed upon actuation.

In some situations, the individual valve fails to respond to actuation less than about 10% of actuation times, or less than about 1% of actuation times, or less than about 0.1% of actuation times, or less than about 0.01% of actuation times, or less than about 0.001% of actuation times, or less wherein the actuation times are at least 10, 20, 50, 100, 200, 500, or 1000 actuations, wherein the actuations are optionally sequential, or wherein the actuations are sequential and the first ones are performed by the valves. In an example, with the individual valve in a normally closed configuration, following actuation an elastic layer of the valve will stick to one or more surfaces of the valve (e.g., a surface of the valve seat) and remain open less than about 10% of actuation times, or less than about 1% of actuation times, or less than about 0.1% of actuation times, or less than about 0.01% of actuation times, or less than about 0.001% of actuation times, or less. In another example, with the individual valve in a normally open configuration, following actuation an elastic layer of the valve will stick to one or more surfaces of the valve (e.g., a surface of the valve seat) and remain closed less than about 10% of actuation times, or less than about 1% of actuation times, or less than about 0.1% of actuation times, or less than about 0.01% of actuation times, or less than about 0.001% of actuation times, or less.

Fluidics devices provided herein can have low or substantially low leakage rates per actuation. In some embodiments, a fluidics device comprises one or more pneumatically actuated valves, an individual valve of the one or more pneumatically actuated valves has a fluidics layer that is independent of an actuation layer of the individual valve. The individual valve leaks upon at most about 1/100, or 1/1000, or 1/10,000, or 1/100,000, or 1/1,000,000 actuations, wherein the actuations are optionally sequential, or wherein the actuations are sequential and the first ones are performed by the valves. In some situations, the individual valve leaks upon at most 1/100, or 1/1000, or 1/10,000, or 1/100,000, or 1/1,000,000 actuations when in use or storage for at least about 1 day, or 2 days, or 3 days, or 4 days, or 5 days, or 6 days, or 1 week, or 2 weeks, or 3 weeks, or 1 month, or 12 months, or 1 year, or 2 years, or 3 years, or 4 years, or 5 years, or 6 years, or 7 years, or 8 years, or 9 years, or 10 years, wherein the actuations are optionally sequential, or wherein the actuations are sequential and the first ones are performed by the valves.

2. Fluidic Devices

The fluidic devices of this invention comprise (1) a fluidics layer, (2) an actuation layer and (3) an elastic layer sandwiched between them.

A. Fluidics Layer

A fluidics layer typically comprises one or more fluidic conduits defining fluid paths and comprising an interruption that prevents fluid flow along the path. The fluidics layer also can comprise at least one chamber, e.g., a macrofluidic chamber, into which fluid can flow and that can function as, for example, a reaction chamber. Fluidic channels can be internal to the fluidics layer.

In one embodiment of this invention, the fluidics layer comprises a fluidics manifold and a via layer. The via layer and the fluidics manifold are configured to mate, creating a number of functional elements. These elements include valve inlets and the valve outlets, fluidic channels, fluidic chambers, fluidic ports, and diaphragm pump chambers. The via layer and fluidics manifold also can comprise apertures which, when aligned, form guides for fasteners that hold of the layers of the devices together. In other embodiments, external pressure can be exerted on fluidic conduits by apertures that traverse the fluidics layer, the elastic layer and enter the actuation layer. Furthermore, liquid can traverse the layers in such conduits, for example, to evacuate waste or to cross liquid paths in the device.

i. Fluidics Manifold

A fluidics manifold comprises a mating face adapted to mate with the via layer. Into this face are introduced a variety of functional elements.

The fluidics manifold can comprise an aperture that defines a non-micro fluidic volume that traverses the manifold. This aperture can function as an entry point to introduce fluid into the device. On the mating surface onto which the aperture opens, the aperture can be in fluidic communication with a fluidic channel, e.g., a microfluidic channel or a macrofluidic channel imposed on the surface. The apertures can traverse the piece forming a conduit, e.g., a bore. In some situations, a non-microfluidic aperture in the article that communicates with a microfluidic channel on a surface also creates a path that communicates between the two surfaces in the article onto which it opens. Such a conduit can function as an outlet passage from the fluidics manifold. A non-microfluidic aperture that is in fluid communication with a microfluidic channel on a first surface generally will have a smaller port on one surface than on the other surface onto which it opens, thus taking the shape of a well, or function as an exit port. The apertures can be adapted to receive a liquid and transmit it to the microfluidic channel with which they are in fluid communication. The compartments can take any desired shape such as cylindrical, cone shaped, box shaped, etc. In choosing the shape, one can pay attention to how surface tension will move the fluid meniscuses as the reservoir fills up and empties. The microfluidic channel can be in communication with a variety of elements, such as openings, conduits, chambers and valve chambers and seats. (For purposes of this invention, unless otherwise specified, conduits are considered to be in fluid communication even if it is across a valve seat.) Alternatively, as will be described, channels can be comprised in a surface on the via layer which mates with the fluidics manifold. Channels in either the fluidics manifold or the via layer can be in fluid communication with fluidic chambers in the fluidics manifold. Fluidic chambers can be formed as a wells that open onto the mating face of the fluidics manifold. Fluidic chambers can have microfluidic volumes or macrofluidic volumes. The fluidic chambers can function as reaction chambers in which chemical reactions are performed or as metering chambers. The mating face of the manifold also can comprise a shallow well that functions as a valve chamber of a diaphragm pump, as will be described in more detail below. The fluidics manifold can be comprised of a rigid plastic.

In some embodiments, the fluidics manifold of a microfluidic device need not have a high degree of precision or detail. Such high degree of precision or detail may be provided in the via layer. This enables the fluidics manifold to be fabricated using molding processes readily available, such as low fidelity molding processes (e.g., blow molding).

Fluidic conduits may be formed in surfaces of the fluidics manifold or via layer as furrows, dimples, cups, open channels, grooves, trenches, indentations, impressions and the like. Conduits or passages can take any shape appropriate to their function. This includes, for example, channels having, semi-circular, circular, rectangular, oblong or polygonal cross sections. Valves, reservoirs and chambers can be made having dimensions that are larger than channels to which they are connected. Chambers can have walls assuming circular or other shapes. Areas in which a conduit becomes deeper or less than a connecting passage can be included to change the speed of fluid flow. The conduits comprise surfaces or walls that contact fluids flowing through them. The fluid in the fluidics layer can be a liquid, a gas. An emulsion or a suspension.

In some situations, the fluidics manifold includes one or more laminate layers (or sub-layers) for overpasses, reservoirs, pumps, and macro-scale channels. In an example, the fluidics manifold includes a packed column.

ii. Via Layer

In some embodiments, the via layer is a sheet formed of a polymeric material (e.g., plastic). The via layer in some cases is thin and substantially flat. The via layer comprises a first face (or first surface) that faces and mates with the mating face of the fluidics manifold and a second face (or second surface) that faces the elastic layer. The via layer typically comprises fluidic channels, typically microfluidic channels, introduced into the first surface, though meso- (i.e., mesoscopic scale, e.g., a scale on the order of 1 micrometer) and nanoscale channels may be used in some situations. The fluidic channels can be in fluid communication with pairs of apertures that traverse the via layer and that function as valve inlets and valve outlets. The apertures serve as vias that connect fluidic channels with valve chambers. Thinning the via layer allows introduction of apertures with smaller diameters. Also, to the extent the via layer is thin, the vias have decreased dead volume. In certain embodiments, the apertures have the same cross-sectional area as the microfluidic channels with which they communicate. For example, the via layer has a thickness of no more than about 0.1 mm, or 0.2 mm, or 0.3 mm, or 0.4 mm, or 0.5 mm. The area of the second surface of the via layer that surrounds the valve inlet and valve outlet functions as a valve seat. The via layer also can comprise an aperture configured to oppose a pump chamber in the fluidics manifold. The pump chamber will be in fluid communication with fluidic channels acting as inlets and outlets to the diaphragm pump.

In this configuration, the surface or face of the fluidics manifold or via layer that face each other generally comprises a substantially planar, flat or smooth surface into which indentations, depressions or etchings have been made to form the functional elements of fluidics and actuation layers, e.g., channels, chambers and valves. A portion of the surface (e.g., a planar, smooth or flat surface) that contacts the elastic layer is referred to as a contact surface. Portions of the surfaces that are indented, depressed or etched that face the elastic layer are referred to as exposed surfaces. Surfaces over which fluid flows, including conduits, channels, valve or pump bodies, valve seats, reservoirs, and the like are referred to as functional surfaces.

The via layer can be comprised of a flexible plastic coated with an adhesive and overlaid with a protective covering. The features described above can be introduced into the plastic through the adhesive and protective covering by for example, laser cutting, laser grooving or laser machining. During assembly, the protective layer is removed exposing the adhesive the via layer is aligned with corresponding features in the fluid manifold and pressed against the fluidics manifold, attaching the via layer to the fluidics manifold in forming the fluidics layer.

B. Elastic Layer

The elastic layer typically is formed of a substance that can deform when vacuum or pressure is exerted on it, and can return to its un-deformed state upon removal of the vacuum or pressure, e.g., an elastomeric material. Because the deformation dimension is measure in less than ten mm, less than one mm, less than 500 mm, or less than 100 mm, the deformation required is lessened and a wide variety of materials may be employed. Generally, the deformable material has a Young's modulus having a range between about 0.001 GPa and 2000 GPa, preferably between about 0.01 GPa and 5 GPa. Examples of deformable materials include, for example but are not limited to thermoplastic or a cross-linked polymers such as: silicones (e.g., polydimethylsiloxane), polyimides (e.g., Kapton™, Ultem), cyclic olefin co-polymers (e.g., Topas™, Zeonor), rubbers (e.g., natural rubber, buna, nitrile, EPDM), styrenic block co-polymers (e.g., SEBS), urethanes, perfluoro elastomers (e.g., Teflon, PFPE, Kynar), Mylar, Viton, polycarbonate, polymethylmethacrylate, santoprene, polyethylene, or polypropylene. Other classes of material that could function as the elastic layer include, for example, but are not limited to metal films, ceramic films, glass films or single or polycrystalline films. Furthermore an elastic layer could comprise multiple layers of different materials such as combination of a metal film and a PDMS layer or a Parylene-containing layer (i.e., a layer having one or more poly(p-xylylene) polymers).

In devices employing monolithic elastic layers to form one or more diaphragm valves, the elastic layer typically is sealed against both the fluidics layer and the actuation layer in order to inhibit fluid from leaking out of the valve and between the layers. In certain embodiments this sealing is accomplished by bonding the elastic layer to the fluidics layer and/or the actuation layer. In this case it may be necessary to prevent bonding of the elastic layer to the valve seat. However, the present invention uses physical pressure exerted through the raised sealing rings to seal the valves. Therefore the elastic layer used in the devices of this invention need not to be comprised of a material capable of bonding with or being made to bond with the surfaces of the fluidics layer or the actuation layer.

In certain embodiments, the elastic layer comprises a monolithic, un-sculpted sheet of elastic material. It can comprise holes or apertures functioning as guides for fasteners (and/or other structural elements) and to allow transmission of pressure from the actuation layer into fluidic channels in the fluidics layer. When pressed against the second face of the via layer, the elastic layer closes the valve vias, thereby preventing fluid from flowing through a path comprising a valve.

C. Actuation Layer

The actuation layer comprises a surface configured to fluidically mate with the fluidics layer across the elastic layer. The surface can be substantially flat except for sealing rings which are raised above the mating surface. The sealing rings may be curved shaped or corner shaped. In some cases, the sealing rings are closed loops that are shaped circular, oval, or other shapes, such as serpentine, triangular, square, rectangular, pentagonal, hexagonal, heptagonal, octagonal, or nonagonal, heart shaped, ring shapes, or combinations thereof. A sealing ring can have a cross-sectional aspect of about 0.5 mm to about 5 mm or larger. Because they are raised above the surface of the actuation layer, the sealing rings define a volume which can operate as a valve relief in a diaphragm valves. The actuation layer also comprises actuation conduits that are fluidically connected with the valve relief and which open elsewhere on the actuation layer. Positive pressure or negative pressure (i.e., vacuum) can be transmitted from these openings or ports to the valve relief. Actuation conduits can be configured as internal channels in the actuation layer. Alternatively, they can be configured as bores or apertures connecting one face of the actuation layer with the mating face. The fluid that transmits pressure through the actuation conduits is referred to as an actuant. It can be a gas or a liquid.

The actuation layer also can comprise stand-offs, or raised areas, such as rings, that define a distance between the sealing rings and the second face of the via layer and defines the degree to which the elastic layer will compress. Generally, the standoffs will have a higher profile off the actuation surface than the sealing rings. Without wishing to be limited by theory, it is believed that one challenge faced in sealing valves involves lack of uniformity in the surfaces of the actuation layer and the fluidics layer, resulting in un-evenness in the conformity of the layers when they are mated. Generally, the elastic layer is compressible and can take up some slack. However, the raised sealing rings of the actuation layer decrease the need for perfect tolerances between layers, in part by focusing pressure against the elastic layer. Stand-offs in the actuation layer allow one to define the distance between layers in the assembled device and, thereby, control the pressure that any ring can exert against the elastic layer.

In some embodiments, with a one or more vias disposed atop a sealing member (e.g., sealing ring) in an actuation layer and separated from the actuation layer by an elastic layer, a two-dimensional center point of the one or more vias (i.e., the center of a single via or a mid-point between two or more vias) may be laterally disposed in relation to the center of a sealing member (i.e., along a vector parallel to a surface of the actuation layer) by at least about 1%, or 2%, or 3%, or 4%, or 5%, or 6%, or 7%, or 8%, or 9%, or 10%, or 15%, or 20% of a cross-sectional dimension (e.g., diameter) of the sealing member. A device provided herein may function as expected with a design tolerance (100% - center point deviation) of at least about 99%, or 98%, or 97%, or 96%, or 95%, or 94%, or 93%, or 92%, or 91%, or 90%, or 85%, or 80%. In some cases, structural components of devices can have tolerances that may permit the device layers to be oriented with one another with relatively high degree of variability—e.g., in some cases, substantially perfect alignment of device layers is not necessary for a device to function in the intended manner (e.g., valves opening and closing, fluid flowing from a first chamber to a second chamber, wherein the two chambers are connected by a pneumatically-actuated valve as described herein). In an example, with the via layer laterally shifted in relation to the actuation layer or the elastic layer (or both) by as much as 0.1%, or 0.2%, or 0.3%, or 0.4%, or 0.5%, or 0.6%, or 0.7%, or 0.8%, or 0.9%, or 1%, or 2%, or 3%, or 4%, or 5%, or 6%, or 7%, or 8%, or 9%, or 10%, or 15%, or 20% of a characteristic dimension of the fluidics device (e.g., length or width taken along an axis parallel to a surface of the fluidics device), the fluidics device will function in the intended manner. A lateral shift of 0% in such a case corresponds to a device in which all three layers are substantially perfectly aligned. For example, for a fluidics device having two sets of vias in the via layer, with each set having two vias separated from one another by a separation distance having a midpoint and each set of vias overlying a sealing ring in the actuation layer that has a center point (see, e.g., FIG. 15A), a lateral shift of 0% indicates that the midpoint between the two vias is disposed directly over the center point of the sealing ring.

Figure 15A:
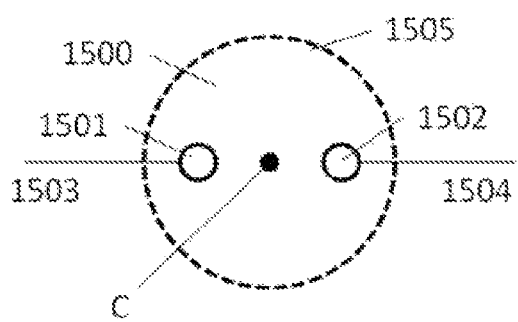
FIGS. 15A-15C schematically illustrate various configurations of vias.
Figure 15B:
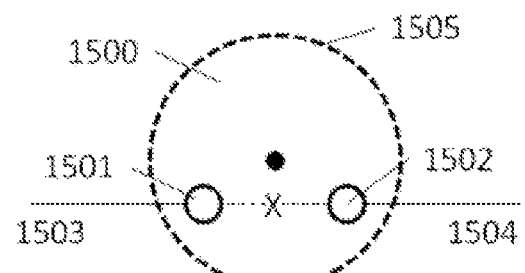
Figure 15C:
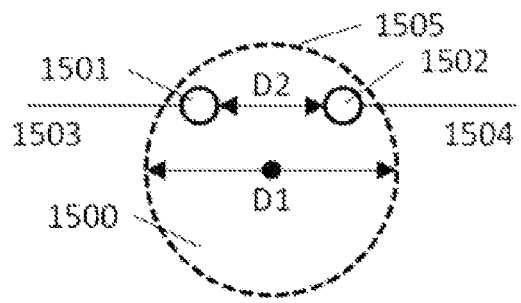

FIG. 15A shows a first via 1501, second via 1502, a first channel 1503 in fluid communication with the first via 1501 and a second channel 1504 in fluid communication with the second via 1502. The first via 1501, second via 1502, first channel 1503 and second channel 1504 are formed in the via layer 1500. A sealing member (e.g., sealing ring) 1505 formed in an actuation layer (see. FIG. 11) is disposed below (i.e., into the plane of the page) the vias 1501 and 1502. The first via 1501 and second via 1502 are oriented substantially symmetrically in relation to a midline dividing the sealing ring 1505 into two halves. A midpoint of a separation vector between the first via 1501 and the second via 1502 is disposed substantially over a center point (C) of the sealing member 1505. However, as shown in FIGS. 15B and 15C, the first via 1501 and second via 1502 may be shifted in relation to the center point (C) of the sealing ring while permitting the fluidics device to function as expected. The midpoint (marked by an 'X' in FIG. 15B) of the separation vector (dotted line) between the first via 1501 and the second via 1502 is shifted in relation to the center point of the sealing member 1505. This may be due to a misalignment of the via layer or the actuation layer, for example. The configuration of vias of FIGS. 15B and 15C advantageously enables a valve defined by the via layer, an elastic layer adjacent the via layer (not shown) and the actuation layer to open and close, as expected, to permit fluid to flow from the first channel 1503 to the second channel 1504.

With reference to FIG. 15C, the sealing member (e.g., sealing ring) in an actuation layer has a first dimension D1 and the vias have a center-to-center dimension D2. D1 and D2 are measured along parallel planes. In some embodiments, when the layers are comprised in a functional device (e.g., valve), the vias, when viewed from top, are disposed in a boundary defined by the sealing member (ring, as illustrated). D1 is greater than D2. The sealing member can generally have a dimension that is greater than a center-to-center dimension of the vias. In some situations, D2 divided by D1 less than or equal to about 0.1, or 0.2, or 0.3, or 0.4, or 0.5, or 0.6, or 0.7, or 0.8, or 0.9, or 0.95, or 0.96, or 0.97, or 0.98, or 0.99. With the vias separated from one another by a first width and the sealing member having a second width (along a plane parallel to a plane having the first width), the second width is greater than the first width. The second width can be at most 10%, or 20%, or 30%, or 40%, or 50%, or 60%, or 70%, or 80%, or 90%, or 95%, or 99% of the first width.

Actuation conduits terminate in a valve release on the mating surface and at ports configured to engage pressure lines of an actuation manifold or to accommodate solenoids. Such ports can be located on the mating surface, on the external surface or in the sides of the actuation layer.

The actuation layer can also comprise one or more apertures or finger-like structures adapted to allow access to the elastic layer. For example an aperture can be positioned into the face a heating chamber in the fluidics layer and can be adapted to accept a heating element. Also, the actuation layer can comprise one or more notches in the external face adapted to accept a source of magnetic force, e.g., a permanent magnet or any electromagnet. Such a magnet can be configured to exert magnetic force on a capture chamber in the fluidics layer. In some cases, the actuation layer may include alignment features, such as for assembly, and/or optical features, such as optical apertures, molded lenses, optical gratings, or waveguides.

Certain conduits in the actuation layer can transmit positive or negative pressure through holes in the elastic layer into fluidic conduits in the fluidics layer. Such pressure can be used to move liquids (e.g., waste solution, wash buffer(s)) through fluidic conduits.

The actuation layer may be formed of a metallic material (e.g., aluminum, a metal alloy), a polymeric material, or a composite material. In some cases, the actuation layer is formed of a polymeric material, such as a plastic. In an example, the actuation layer is formed from a printed circuit board, which may be formed of an elastic material. In some situations, the actuation layer is formed of polyimide.

Actuation conduits of the actuation layer can be in fluid communication with an actuation system, which can control actuation of the valves. An actuation system can, for example, comprise one or more solenoid valves that, when appropriately positioned, put an actuation conduit in communication with a source of positive pressure compared with ambient and/or a source of negative pressure compared with ambient. In a solenoid valve, electric current through a solenoid actuates movement of a magnet within the solenoid that comprises ports that can be switched between selected inlet and outlet ports, thereby directing a fluid (gas or liquid) along an open path, or preventing fluid flow at a stop. Typically the magnet is spring-biased to hold the valve in a selected position when not being actuated. The actuation system can be controlled by a control system, such as a computer programmed to operate the solenoid valves and the pressure sources.

3. Methods of Making

In some embodiments, a method for manufacturing a fluidics device a) providing a via layer, an actuation layer and an elastic layer disposed between the via layer and the actuation layer, said actuation layer having a raised sealing member adjacent the elastic layer, said via layer having one or more vias, and b) mechanically sealing the via layer, actuation layer and the elastic layer against one another to form the fluidics device. The via layer, actuation layer and the elastic layer can be mechanically sealed, for example, with the aid of a clamp and/or an adhesive. The design tolerance of the device permits the via layer, actuation layer and the elastic layer to be mechanically sealed against one another in a relative short time period while permitting the device to function in an intended manner. In some cases, the via layer, actuation layer and the elastic layer are mechanically sealed (including in some cases any drying or curing time that may be necessary to mechanically seal the layers) within a time period of 30 minutes or less, or 25 minutes or less, or 20 minutes or less, or 15 minutes or less, or 10 minutes or less, or 5 minutes or less, or 1 minute or less, or 30 seconds or less, or 15 seconds or less, or 10 seconds or less, or 5 seconds or less, or 4 seconds or less, or 3 seconds or less, or 2 seconds or less, or 1 seconds or less to yield the fluidics device (e.g., microfluidics device) configured to flow a fluid through the one or more vias and in some cases one or more channels in the via layer and or a fluidics layer at a flow rate of at least about 50 nanoliters (nL)/second (s), or 100 nL/s, or 200 nL/s, or 300 nL/s, or 400 nL/s, or 500 nL/s, or 1 microliter (uL)/s, or 2 uL/s, or 3 uL/s, or 4 uL/s, or 5 uL/s, or 10 uL/s, or 20 uL/s, or 30 uL/s, or 40 uL/s, or 50 uL/s, or 100 uL/s, or 200 uL/s, or 300 uL/s, or 400 uL/s, or 500 uL/s, or 1 milliliter (mL)/s, or 2 mL/s, or 3 mL/s, or 4 mL/s, or 5 mL/s, or 10 mL/s, or 20 mL/s, or 30 mL/s, or 40 mL/s, or 50 mL/s, or 100 mL/s, or 200 mL/s, or 300 mL/s, or 400 mL/s, or 500 mL/s, or 1 L/s.

The fluidics and/or actuation layers of the device may be made out of various materials, in particular, polymers, e.g., plastics. These include, but are not limited to, an olefin co-polymer (e.g., Zconor), a cycloolcfin polymer ("COP"), a cycloolcfin co-polymer ("COC"), an acrylic, a liquid crystal polymer, polymethylmethoxyacrylate (PMMA), a polystyrene, a polypropylene, a polyester, a poly-ABS and a polythiol. The polymeric material that forms the fluidics or actuation layers can be a flowable polymer that can be molded. For example, the fluidics manifold can comprise a polyester (e.g., PET-G) and the actuation layer can comprise ABS plastic. Glass (e.g., borosilicate glasses (e.g., borofloat glass, Corning Eagle 2000, pyrex)), silicon and quartz also can be used.

Various layers (including structures therein, such as vias and channels) provided herein may be formed from substrates formed of metallic materials or polymeric materials (e.g., plastic). Depending on the choice of the material different fabrication techniques may be used. In certain fluidic devices of this invention, a plastic substrate can be a flat and/or rigid object having a thickness of about 0.1 mm or more, e.g., about 0.25 mm to about 5 mm. Grooves and apertures in the via layer can be formed by laser etching e.g., in a single process step. During this process ridges can build up along the sides of the grooves and vias as plastic melts and reflows. Use of a soft, pressure sensitive adhesive (e.g., a 1 mil silicone transfer tape) that can compress/reflow accommodates this during assembly. In some cases, channels and/or vias are formed with the aid of semiconductor fabrication techniques employing, for example, masks and various etching chemistries.

A layer (or other structural component of a device provided herein) may be made out of plastic, such as polystyrene, using a hot embossing technique. The structures are embossed into the plastic to create the bottom surface. A fluidics manifold may then be bonded to a via layer. In another embodiment a foil is embossed (e.g., using a roller) wherein sharp features on the embossing tool simultaneously punctures the via holes. Injection molding is another approach that can be used to create such a device. In some cases, lithography may also be utilized. Yet another approach involves the use of epoxy casting techniques to create the obstacles through the use of UV or temperature curable epoxy on a master that has the negative replica of the intended structure. Laser or other types of micromachining approaches may also be utilized to create vias and/or channels. Other suitable polymers that may be used in the fabrication of the device are polycarbonate, polyethylene, and poly(methyl methacrylate). In addition, metals like steel and nickel may also be used to fabricate the master of the device of the invention, e.g., by traditional metal machining. Three-dimensional fabrication techniques (e.g., rapid prototyping by stereolithography or SLA) may be employed to fabricate a device in one piece. This method is particularly useful to make actuation layers comprising internal actuation channels. Other methods for fabrication are known in the art.

The microfluidic device typically comprises multiple microchannels and vias that can be designed and configured to manipulate samples and reagents for a given process or assay. In some embodiments the microchannels have the same width and depth. In other embodiments the microchannels have different widths and depths. In another embodiment a microchannel has a width equal to or larger than the largest analyte (such as the largest cell) separated from the sample. In another embodiment the channels are smaller than the largest analyte (such as a cell or bead). This is a way of collecting materials, e.g., collecting particles on a dam. For example, in some embodiments, a microchannel in a microfluidic device can have a cross-sectional dimension between about 25 microns to about 500 micron, e.g., about 100 microns, about 150 microns or about 200 microns. In other embodiments, the channels have a width greater than any of 50, 60, 70, 80, 90, 100, 110, 120, 130, 140, 150, or 300 microns. In some embodiments, a microchannel has a width of up to or less than any of 100, 90, 80, 70, 60, 50, 40, 30 or 20 microns. In some embodiments a microchannel in a microstructure can have a depth greater than any of 50, 60, 70, 80, 90, 100, 110, 120, 130, 140 or 150 microns. In some embodiments, a microchannel has a depth of up to or less than 100, 90, 80, 70, 60, 50, 40, 30 or 20 microns. In some embodiments a microchannel has side walls that are parallel to each other. In some other embodiments a microchannel has a top and bottom that are parallel to each other. In some other embodiments a microchannel comprises regions with different cross sections.

The speed at which liquids can be transferred through channels depend on their viscosity, the driving pressure, and the flow restriction of the conduit. By combining micro- and non-micro channels the flow restriction of the conduit between reservoirs can be tailored.

In monolithic devices comprising a plurality of diaphragm valves, each diaphragm valve must be sealed against leakage of fluid out of the valve. In the present invention, sealing rings in the actuation layer exert localized pressure on the elastic layer against the fluidics layer to form a pressure seal. Non-uniformities in the facing surfaces may result in pressures that are not uniform across the entire surface of the sealing ring. However, it is believed that localizing the pressure in the sealing rings results in sufficient pressure across the ring surface to seal the valves. This allows the use of parts made of materials in which high tolerances are more difficult to achieve.

In some embodiments, all three layers (e.g., via layer, elastic layer and pneumatic/actuation layer) or optionally all four layers (e.g., via layer, elastic layer, pneumatic layer, and fluidics manifold) layers are mechanically sealed (or pressed) against one another. In some cases, such mechanical sealing generates pressure (or squeezing) that holds the layers together. Pressure or squeezing of the layers together can be achieved using mechanical fasteners. Mechanical fasteners can be selected from, for example, a screw, a clip, a snap fastener, a staple, a rivet a band (e.g., an elastic band) and a pin. For example, bores through the three layers can function as guides for pins or screws. The fluidic or actuation layer can comprise a snap that tightly snaps into a groove or recess in the other layer. Accordingly, the actuation layer may not be completely planar, but may include bend that is flattened when the layers are fastened. Therefore, the present invention provides a new mechanism for generating functionally pneumatic valve(s) comprising at least 2 or 3 or 4 layers through a single combining/attaching step. This provides a faster and cheaper mechanism to produce functional valves.

In an example, layers are mechanically sealed against one another with the aid of gluing (e.g., glue screw). In such a case, glue may be provided between the layers to hold the layers together when compressed. In another example, layers are mechanically sealed against one another with the aid of a clamp or vacuum. In another example, layers are mechanically sealed against one another with the aid of heat sealing. In another example, layers are mechanically sealed against one another with the aid of ultrasonic welding.

For example, in an assembled device the fluidics layer, elastic layer and actuation layer are sandwiched together. A microfluidic channel in the fluidics layer is interrupted by a valve seat and the termini of the channels adjacent the valve seat open onto the elastic layer through a pair of vias. The valve seat is in contact with the elastic layer, resulting in a closed valve. When negative pressure is transmitted through an actuation channel, the elastic layer is deformed into the valve relief. This opens the valve, creating a path through which liquid can flow. The pressure in the pneumatic chamber relative to the microfluidic channel controls the position of the elastic layer. The elastic layer can be deformed toward the pneumatic chamber when the pressure is lower in the pneumatic chamber relative to the microfluidic channel. Alternatively, the elastic layer can be deformed toward the valve seat when the pressure is lower in the microfluidic channel relative to the pneumatic chamber. When pressure is equal or approximately equal in the microfluidic channel and the pneumatic chamber, the valve can be in a closed position. This configuration can allow for complete contact between the seat and the elastic layer when the valve is closed. Alternatively, when pressure is equal or approximately equal in the microfluidic channel and the pneumatic chamber, the valve can be in an open position. The pneumatically actuated valves can be actuated using an inlet line that is under vacuum or under positive pressure. The vacuum can be approximately house vacuum or lower pressure than house vacuum, e.g., at least 15 inches Hg or at least 20 inches Hg. Alternatively, in a normally closed valve, the valve relief can be connected to ambient pressure and pressure in the fluid path can push open the valves. The positive pressure can be about 0, about 1, about 2, about 5, about 10, about 15, about 20, about 25, about 30, about 35, more than 35 psi or up to about 150 psi. The fluid for communicating pressure or vacuum from a source can be any fluid, such as a liquid or a gas. The gas can be air, nitrogen, or oxygen. The liquid can be any pneumatic or hydraulic fluid, including organic liquid or aqueous liquid, e.g., water, a perfluorinated liquid (e.g., Fluorinert), dioctyl sebacate (DOS) oil, monoplex DOS oil, silicon oil, glycerol or glycol hydraulic fluid oil or automobile transmission fluid.

4. System

A fluidic system can comprise a fluidic assembly and an actuation assembly. The fluidic assembly can comprise (1) elements to engage and hold the fluidic portion of a microfluidic device that comprises fluidic conduits, and (2) a fluid delivery assembly, such as a robot or a pump (or other tubing or direct mating), configured to deliver fluids to the fluidics manifold or to the microfluidic conduits. The actuation assembly can comprise (1) elements to engage and hold the actuation portion of a microfluidic device that comprises actuation conduits, (2) an actuation manifold configured to mate or align with ports on the microfluidic device and to deliver actuant into the actuation conduits microfluidic device; and (3) an actuant delivery assembly, configured to deliver fluids, e.g., air, to the actuation manifold or to the actuation conduits directly. The actuant delivery assembly can comprise a source of positive or negative pressure and can be connected to the actuation conduits through transmission lines. The system can also comprise accessory assemblies. One such assembly is a temperature controller configured to control temperature of a fluid in a fluidic conduit. Another is a source of magnetic force, such as a permanent or electromagnet, configured to apply magnetic force to containers on the instrument that can comprise, for example, particles responsive to magnetic force. Another is an analytic assembly, for example an assembly configured to receive a sample from the fluidic assembly and perform an procedure such as capillary electrophoresis that aids detection of separate species in a sample. Another is a detector, e.g., an optical assembly, to detect analytes in the instrument, for example fluorescent or luminescent species. The instrument also can comprise a control unit configured to automatically operate various assemblies. The control unit can comprise a computer comprising code or logic that operates assemblies by, for example, executing sequences of steps used in procedure for which the instrument is adapted.

5. Methods for Use

The devices of this invention can be used to manipulate fluidics and perform chemical or biochemical reactions on them. In certain embodiments, the devices are useful to perform one or more steps in a sample preparation procedure. For example, a fluidics robot can load a macrofluidic sample containing an analyte from a 96-well microtiter plate to a non-microfluidic well of a device of this invention. The robot also can load reagents onto other non-microfluidic wells of the device that are part of the same fluidic circuit. On-device circuitry, such as diaphragm valves and pumps, can divert fluids into the same chamber for mixing and reaction. A temperature regulator can transmit heat to a chamber, for example, to perform thermal cycling or to "heat-kill" enzymes in a mixture. Fluids can be shuttled between chambers (or valve seats) in preparation of further steps. Analytes can be captured from a volume by contacting the fluid with immobilized specific or non-specific capture molecules. For example, chambers can have immobilized biospecific capture agents. Also, fluids comprising magnetically responsive particles that capture analytes can be mixed with fluids comprising the analyte in various chambers in the device. The particles can be immobilized with a magnetic force and washed to remove impurities. Then the purified analyte can be eluted from the particles and transmitted to an exit chamber for removal from the device.

EXAMPLES

Example 1

A fluidic device 100 of this invention is depicted in the figures. The device comprises (1) a fluidics layer 200 that comprises a fluidics manifold 201 and a via layer 250; (2) an elastic layer 300 and (3) an actuation layer 400.

Fluidics manifold 201 is a piece of molded plastic that comprises a mating surface 204. The fluidics manifold has a fluid inlet 202 configured as an aperture through the mating face that opens into a well on an outside surface 215 of the fluidics manifold. A plurality of macrofluidic chambers (210, 211, 212) in the fluidics manifold open onto the mating surface. The fluidic channels 207 are disposed in the mating surface as grooves. The fluidic channels are in fluid communication with the fluidic chambers directly or through fluidic channels disposed in the via layer. A recess 208 in the mating surface functions as a particle capture chamber. A plurality of apertures (205*a-d*, 206*a-d*) through the fluidics manifold function as guides for the alignment pins in the assembly fixture and screws to hold the layers of the device together.

Figure 6:
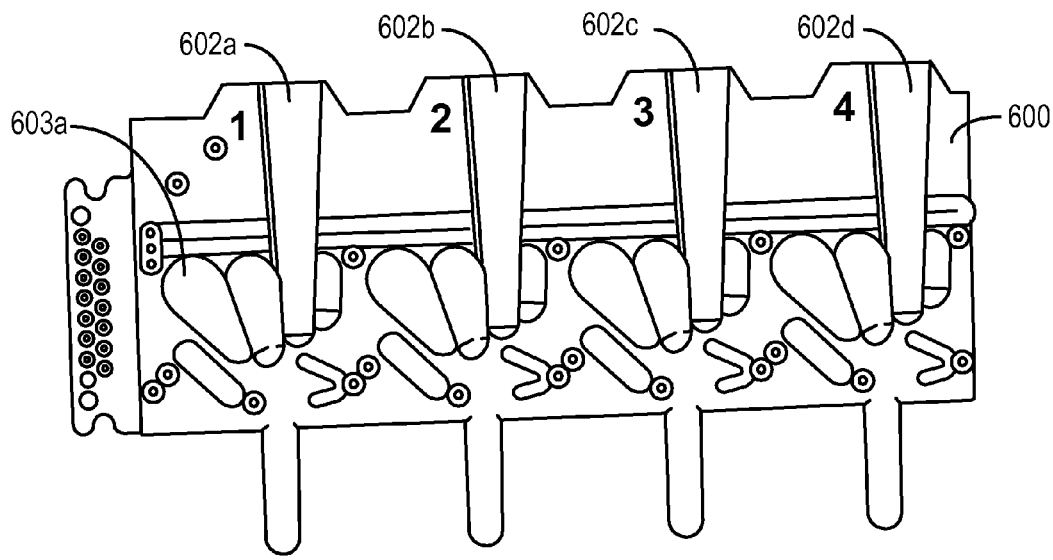
FIG. 6 shows an example of a fluidic device that can be oriented vertically so that macro fluidic sample wells can hold liquids.
Figure 7:
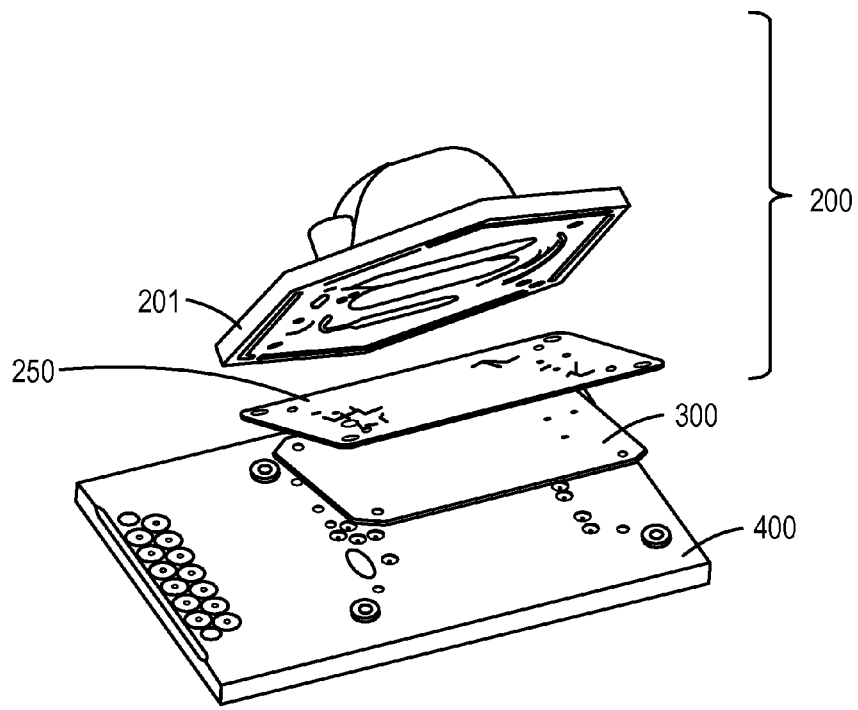
FIG. 7 shows a clamshell view of the device of FIG. 1.

In an embodiment depicted in FIG. 6, fluidics manifold 600 comprises a plurality of fluid inlets 602*a-d*. In this embodiment, the fluidics manifold is configured to be oriented so that the fluid inlets are vertical and able to receive and hold liquid.

The via layer 250 is comprised of a polymeric material (e.g., a thin plastic material, an elastomer) that can be more flexible than the material from which the fluidics manifold is made. A first surface of the via layer (FIG. 3A) faces the mating surface of the fluidics manifold. The first surface comprises fluidic channels 251*a-b* that, when properly aligned with the mating surface of the fluidics manifold, serve as fluidic connections between inlets, macrofluidic channels, chambers, valves and/or pumps. At the location of a diaphragm valve, a fluidic channel comprises an interruption of the groove. Two apertures or vias (260*a'* and 260*a''*; 260*b'* and 260*b''*), communicate with the first surface (FIG. 3A) and a second surface (FIG. 3B) of the via layer. The apertures are in fluidic communication with the ends of the fluidic channels at the location of the interruption. Each pair of vias will function as a valve inlet and a valve outlet in a diaphragm valve. The via layer also comprises an aperture 258 positioned to align with the capture chamber 208 in the fluidics manifold. This aperture is in fluid communication with two fluidic channels in the first surface of the via layer. A plurality of apertures in the via layer (255*a-d*, 256*a-d*) are positioned to be aligned with apertures in the fluidics manifold and function as guides for fasteners. The second surface of the via layer is generally smooth and flat, and is adapted to be pressed against the elastic layer to seal the vias.

The elastic layer 300 also comprises apertures 306*a-d* positioned to align with the guide apertures of the fluidics manifold and the via layer.

The actuation layer 400 is configured as a plate. It has a surface 404 that faces the elastic layer 300 in an assembled device. Raised rings 417*a-d* in the actuation layer located around fastener guides function as stand-offs and determine how close the surface of the actuation layer can get to the surface of the elastic layer, and how much the elastomer is compressed. Each ring comprises a ridge that in some cases has a thickness less than about 5 mm, or 4 mm, or 3 mm, or 2 mm, or 1 mm, or 0.5 mm, or 0.1 mm, or 0.01 mm. If the parts are warped, valves in close proximity to such stand-offs will still have a well-defined volume. The mating surface comprises a plurality of guide apertures (405*a-d*, 406*a-d*) positioned to align with guide apertures in the other layer for fastening The mating surface also comprises a plurality of sealing rings 460*a-b* that are raised above the otherwise flat mating surface. The sealing rings are positioned such that upon mating with the elastic and fluidics layers, each sealing ring surrounds a pair of via holes, i.e., a valve input and a valve output. Each raised sealing ring defines a well or chamber 461*a-b* that will function as a valve relief in the assembled device. A sealing ring 408 for a capture chamber is positioned to be disposed on assembly opposite the pumping chamber.

The floor of the well formed by a sealing ring comprises a hole (or orifice) 462 that communicates with an actuation conduit 465. Actuation conduits are disposed inside the actuation layer. Each conduit opens at a port 480*a-b*, allowing communication of pressure (positive or negative) between the well and the port. Each actuation conduit is in fluid communication with a positive pressure source (e.g., air compressor) or a negative pressure source (e.g., vacuum pump).

The face of the actuation layer opposite the mating face comprises a groove or notch 415 configured to receive a magnet that can immobilize magnetically responsive particles in a chamber or compartment of the fluidics manifold.

An aperture in the actuation layer is positioned to be disposed opposite a chamber in the fluidics manifold. The aperture is configured to accept a heating element that transmits heat through the elastic layer and the via layer into a chamber in the fluidics manifold. In another embodiment, there also is an aperture through the elastic layer to transmit heat.

The actuation layer also can comprise conduits 475*a-b* and 465*a-b* configured to transmit pressure through a port 490, through holes 370*a-b* and 390 in the elastic layer and holes 270*a-b* and 290 in the via layer into fluidic conduits. This pressure can act as a motive force to move liquid throughout liquid conduits. Such conduits also can carry liquids into and out of the device.

The device is assembled by aligning the functional elements in each layer with their counterpart elements in the other layers and fastening the layers together. In this example, the fasteners are screws that traverse the guide apertures. Fasteners are adapted to exert pressure between the layers such that the sealing rings seal the elastic layer against the sealing rings on the one side and the second surface of the via layer on the other side.

When the layers are properly aligned with each other, assembled and fastened, diaphragm valves are formed. Paired vias function as a valve input and a valve output. The second surface of the via layer that faces the elastic layer serves as a valve seat. A portion of the elastic layer is pressed against the valve seat, closing the valve input and output. The well formed by the ring seal functions as a valve relief. Negative pressure applied through an actuation conduit pulls the diaphragm into the valve relief, creating a valve chamber on the opposite side of the diaphragm, opening a fluid path between the valve input and valve output and allowing fluid to flow along the fluid path.

A capture chamber is formed at a location in which a sealing ring effaces an aperture in the via layer and a pumping chamber. In this configuration the elastic layer does not sit against a valve seat in the via layer and, generally, cannot completely close the valve. Alternatively the chamber can be configured with the elastic layer sitting against the valve relief by raising the floor inside the sealing ring. This would make the chamber volume independent of vacuum quality. The capture chamber is effaced on the actuation side by a notch 415 that is configured to accept a source of magnetic force, such as a permanent magnet. In operation, the elastic layer can be pulled away from the capture chamber, increasing its volume. Magnetically responsive particles that enter the capture chamber can be captured by the magnetic force of the magnet. The elastic layer is pumped in and out, displacing the particles and allowing them to be washed by fluid in the chamber.

Alternatively, the capture chamber can be paired with two diaphragm valves that function as inlet valves and outlet valves, forming a pump. A pumping cycle can comprise the following steps: (1) open the inlet valve and close the outlet valve; (2) perform a draw stroke with the pumping valve to draw fluid into the pumping chamber; (3) close the inlet valve and open the outlet valve; (4) perform a pumping stroke would pumping valve to push fluid out of the pumping chamber.

Figure 8A:
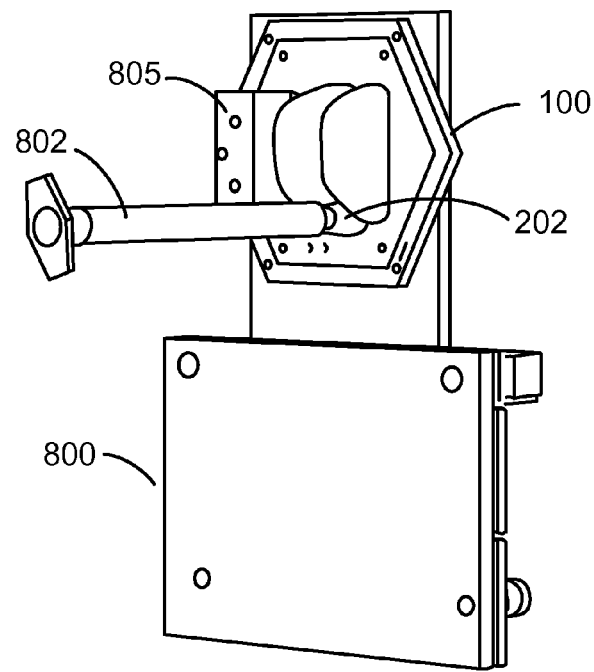
FIGS. 8A and 8B show two sides of an actuation manifold engaged with a device of this invention.
Figure 8B:
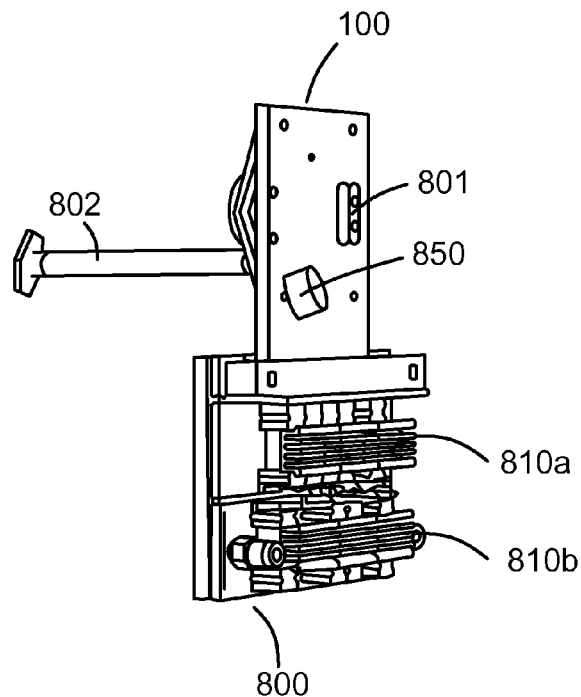

Referring to FIG. 8, device 100 is engaged with actuation manifold 800, which is configured to deliver positive or negative pressure to actuation conduits or to fluid conduits. Fluid inlet 202 is configured to receive syringe 802 by which a liquid sample can be introduced into the device. Temperature control element 805 is configured to regulate temperature in reaction chamber 212. Temperature control element 801 fits into slot 412 to regulate temperature in the reaction chamber 212. Magnet 850 fits into a slot on the actuation layer. Ports 480a-b are configured to engage lines in actuation manifold 800. Actuation manifold 800 comprises solenoid valves 810a-b which are engaged with a source of pressure. Opening or closing the solenoid valves transmits positive or negative pressure through actuation conduits to operate the diaphragm valves, or through holes, e.g., 490 and 290, to provide motive force to move liquids though fluidic conduits.

Figure 9:
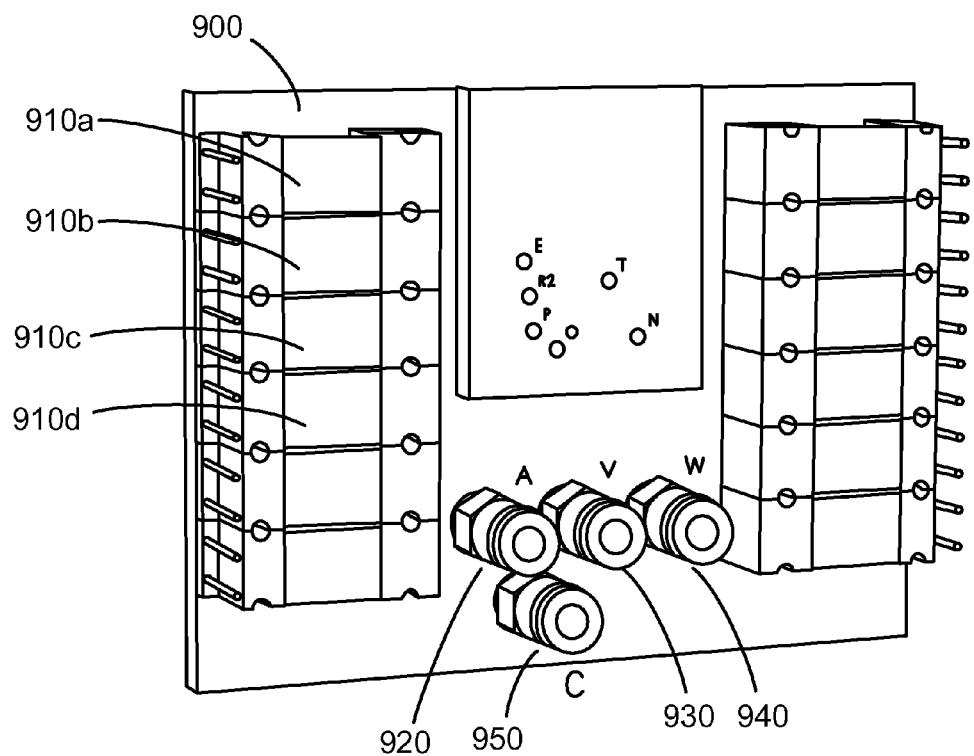
FIG. 9 shows an example of a device in which the actuation layer and actuation manifold have been integrated into one unit.
Figures 10A, 10B:
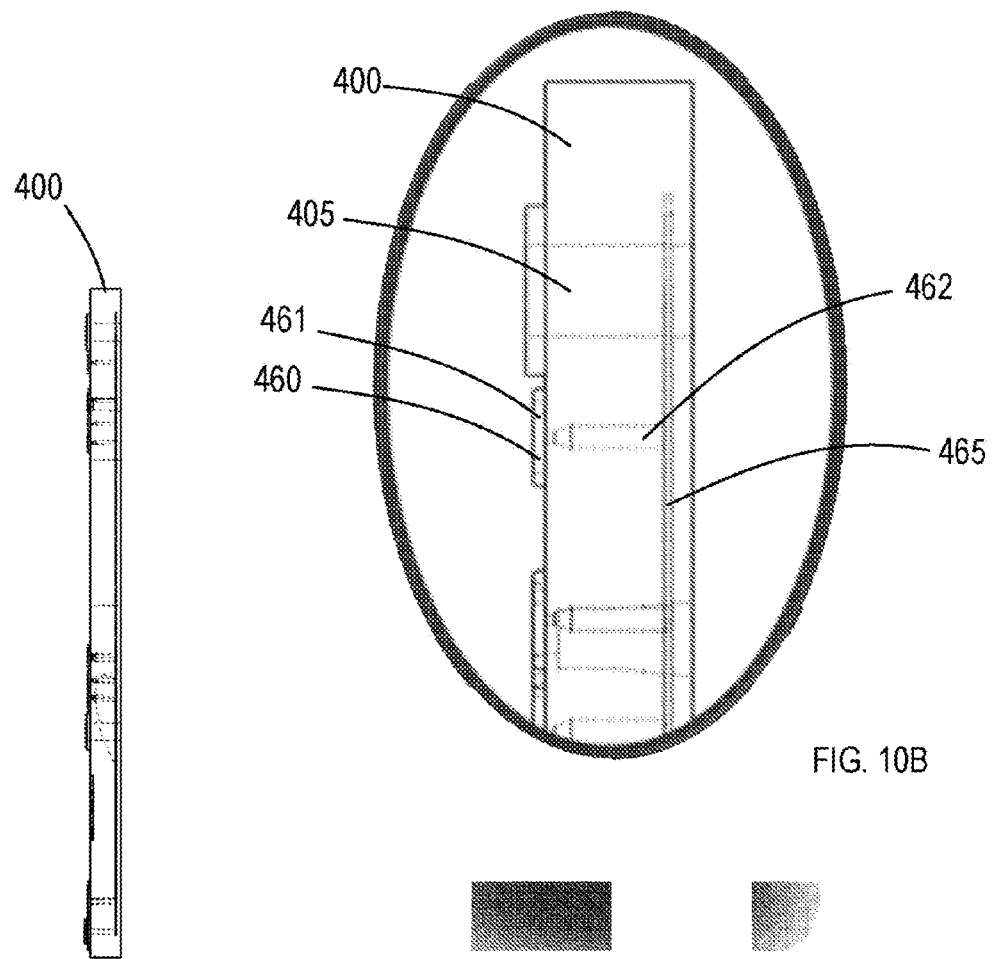
FIG. 10A shows a cross-section of an actuation layer, revealing actuation conduits communicating with a mating surface of the layer.
FIG. 10B shows a magnified portion of the cross-section.

FIG. 9 shows an example of a device in which the actuation layer and actuation manifold have been integrated into one part, 900h. Ports connect to a source of pressure for pressurizing fluids: 'air' (A, 920), vacuum for opening valves (V, 930), waste (may contain liquid to pass a liquid trap) (W, 940) and closing pressure to close the valves (normally higher than the 'air' pressure by which the liquid in the reservoirs is pressurized) (C, 950). Solenoid valves 910a-d control transmission of pressure through actuation conduits to valves as described above, orchestrating operations on fluids in the fluidics layer to pull and possibly meter liquids from the ports E, B2, N, P and T, and to pump or push liquid to the out-port 'O'.

Example 2

Figure 12A:
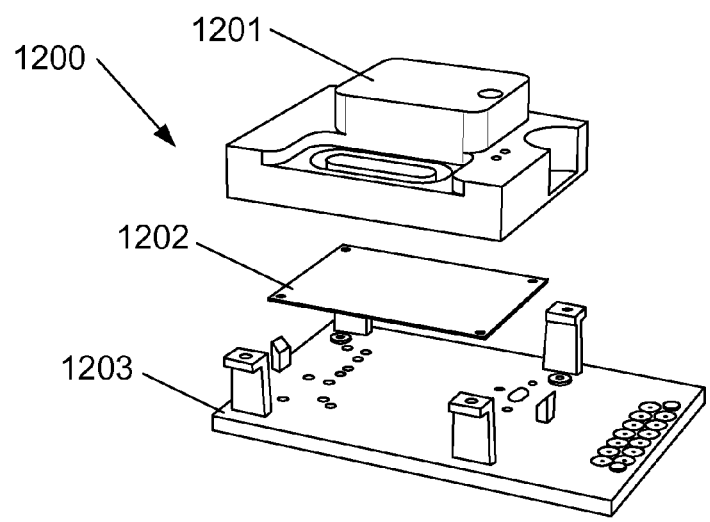
FIGS. 12A-12C shows a fluidics device.
Figure 12B:
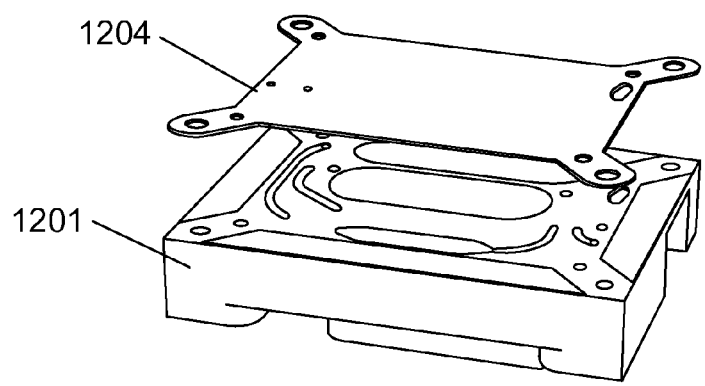

FIG. 12A schematically illustrates a device 1200 having a separable fluidics manifold 1201, elastic layer 1202 and actuation layer 1203. The device 1200 includes a via layer 1204, as shown in FIG. 12B. The via layer 1204 comprises one or more vias and channels. The via layer fluidics manifold 1201, via layer 1204, elastic layer 1202 and actuation layer 1203 are configured to be mechanically sealed against one another. When assembled in the device 1200, the via layer 1204 is disposed adjacent the fluidics manifold 1201 and the elastic layer 1202 is disposed between the actuation layer 1203 and the via layer 1204.

Figure 12C:
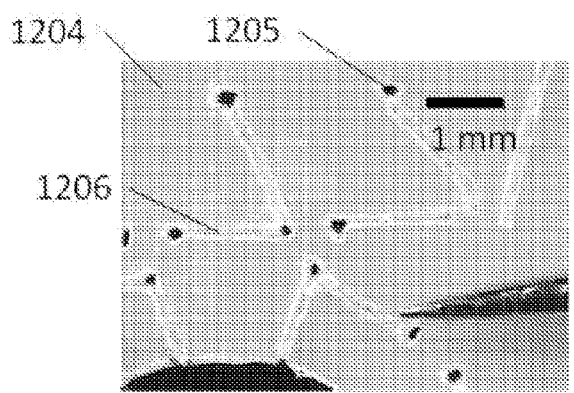

The via layer 1204 includes one or more vias 1205 and channels 1206, as shown in FIG. 12C. The channels 1206 are formed in the via layer 1204 and in fluid communication with one or more vias. Adjacent vias not connected by a channel formed in the via layer may be brought in fluid communication with one another through a channel formed between the elastic layer 1202 and the via layer 1204 (see FIG. 11).

Example 3

Figure 13:
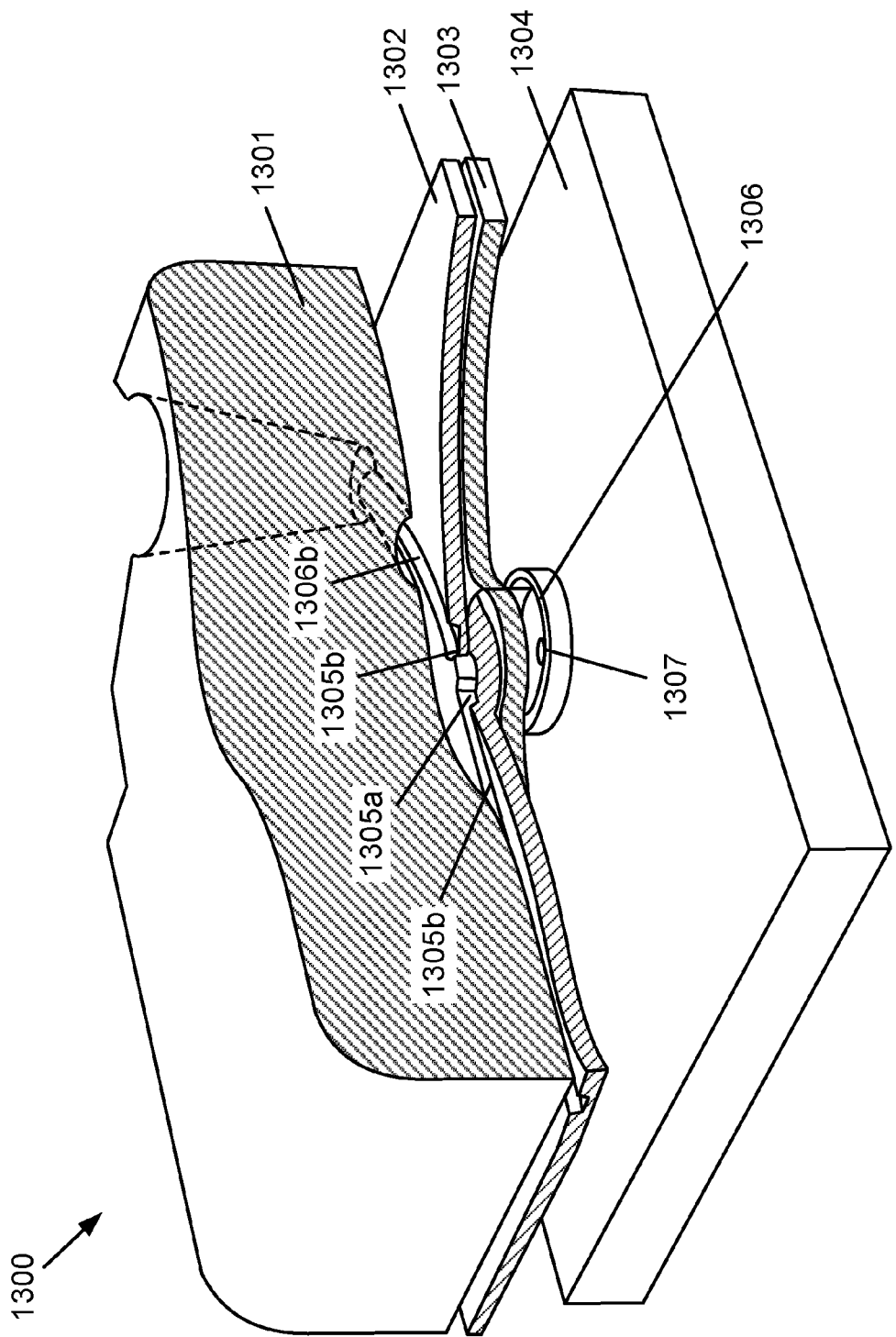
FIG. 13 schematically illustrates a fluidics device.

FIG. 13 schematically illustrates a device 1300 having a fluidics manifold 1301, a via layer 1302 adjacent the fluidics manifold 1301, an elastic layer 1303 adjacent the via layer 1302, and an actuation layer 1304 adjacent the elastic layer 1303. The via layer 1302 includes vias 1305a and 1305b that extend from a first surface of the via layer 1302 to a second surface, the second surface adjacent the elastic layer 1303. The first via 1305a is in fluid communication with a first channel 1306a formed in the via layer 1302, and the second via 1305b is in fluid communication with a second channel 1306b formed in the via layer 1302. The first channel 1306a and second channel 1306b may be brought in fluid communication with one another through a channel formed between the via layer 1302 and the elastic layer 1303.

The actuation layer 1304 includes a sealing ring 1306 having raised ridges that are configured to come in contact with the elastic layer 1303 (see FIG. 11). An orifice 1307 provides positive and/or negative pressure to an area between the elastic layer 1303 and the actuation layer 1304, which aids the elastic layer 1303 to open or close a channel between the via layer 1302 and the elastic layer 1303 that fluidically connects the first via 1305a and the second via 1305b. The channel is defined by a space between the via layer 1302 and the elastic layer 1303.

In some situations, the via layer 1302, elastic layer 1303 and actuation layer define a valve. The valve may be a normally-closed valve or a normally-open valve. In normally-closed cases, the elastic layer 1303 is in contact with the via layer 1302 in the absence of actuation pressure from the actuation layer 1304. Upon the application of actuation pressure (e.g., vacuum) from the actuation layer 1304 to the elastic layer 1303, a portion of the elastic layer 1303 moves away from the via layer 1302 to form a channel between the via layer 1302 and the elastic layer 1303 that fluidically connects the first via 1305a to the second via 1305b. When actuation pressure is terminated, the elastic layer 1303 returns to its normally-closed configuration. In normally-open cases, the elastic layer 1303 is not in contact with the via layer 1302 in the absence of actuation pressure from the actuation layer 1304. Upon the application of actuation pressure (e.g., positive pressure) from the actuation layer 1304 to the elastic layer 1303, a portion of the elastic layer 1303 moves toward the via layer 1302 to close the channel between the via layer 1302 and the elastic layer 1303 that fluidically connects the first via 1305a to the second via 1305b. When actuation pressure is terminated, the elastic layer 1303 returns to its normally-open configuration.

Example 4

Figure 14A:
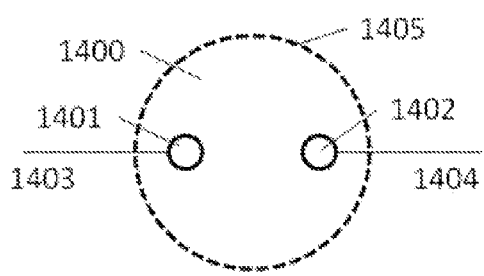
FIGS. 14A-14C schematically illustrate various configurations of vias and channels.
Figure 14B:
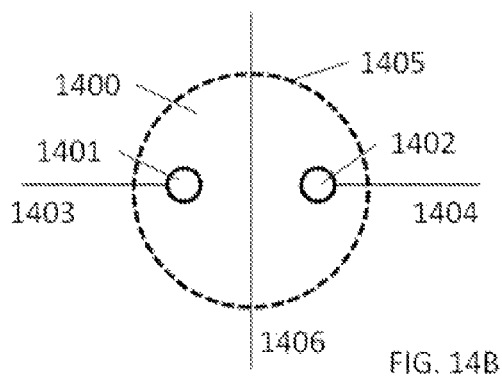
Figure 14C:
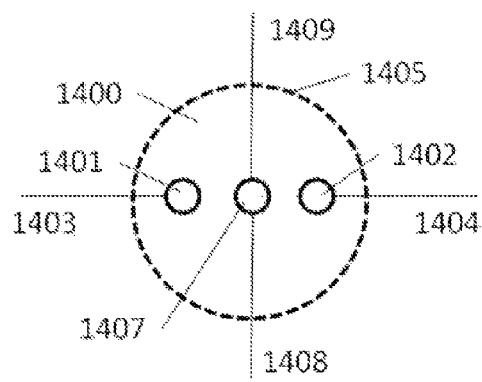

FIGS. 14A-14C show various configurations of vias and channels in a vial a layer 1400. FIG. 14A shows a first via 1401, second via 1402, a first channel 1403 in fluid communication with the first via 1401 and a second channel 1404 in fluid communication with the second via 1402. The first via 1401, second via 1402, first channel 1403 and second channel 1404 are formed in the via layer 1400. A sealing ring 1405 formed in an actuation layer (see. FIG. 11) is disposed below (i.e., into the plane of the page) the vias 1401 and 1402. In some cases, for a normally closed configuration, upon the application of actuation pressure to an elastic layer (not shown) between the actuation layer and the via layer 1400, the vias 1401 and 1402 (and hence the channels 1403 and 1404) are brought in fluid communication with one another. Alternatively, for a normally open configuration, upon the application of actuation pressure to the elastic layer, the fluid communication between the vias 1401 and 1402 (and hence the channels 1403 and 1404) is terminated.

Various configurations of vias and channels are possible in devices provided herein. For example, in FIG. 14B, the via layer 1400 includes a third channel 1406 directed across the sealing ring 1405. The third channel 1406, as illustrated, is not in fluid communication with the vias 1401 and 1402; however, in some cases, the third channel 1406 may be in fluid communication with one or more of the vias 1401 and 1402. As another example, in FIG. 14C, the via layer 1400 includes a third via 1407 in fluid communication with a fourth channel 1408 and a fifth channel 1409.

Example 5

Figure 16:
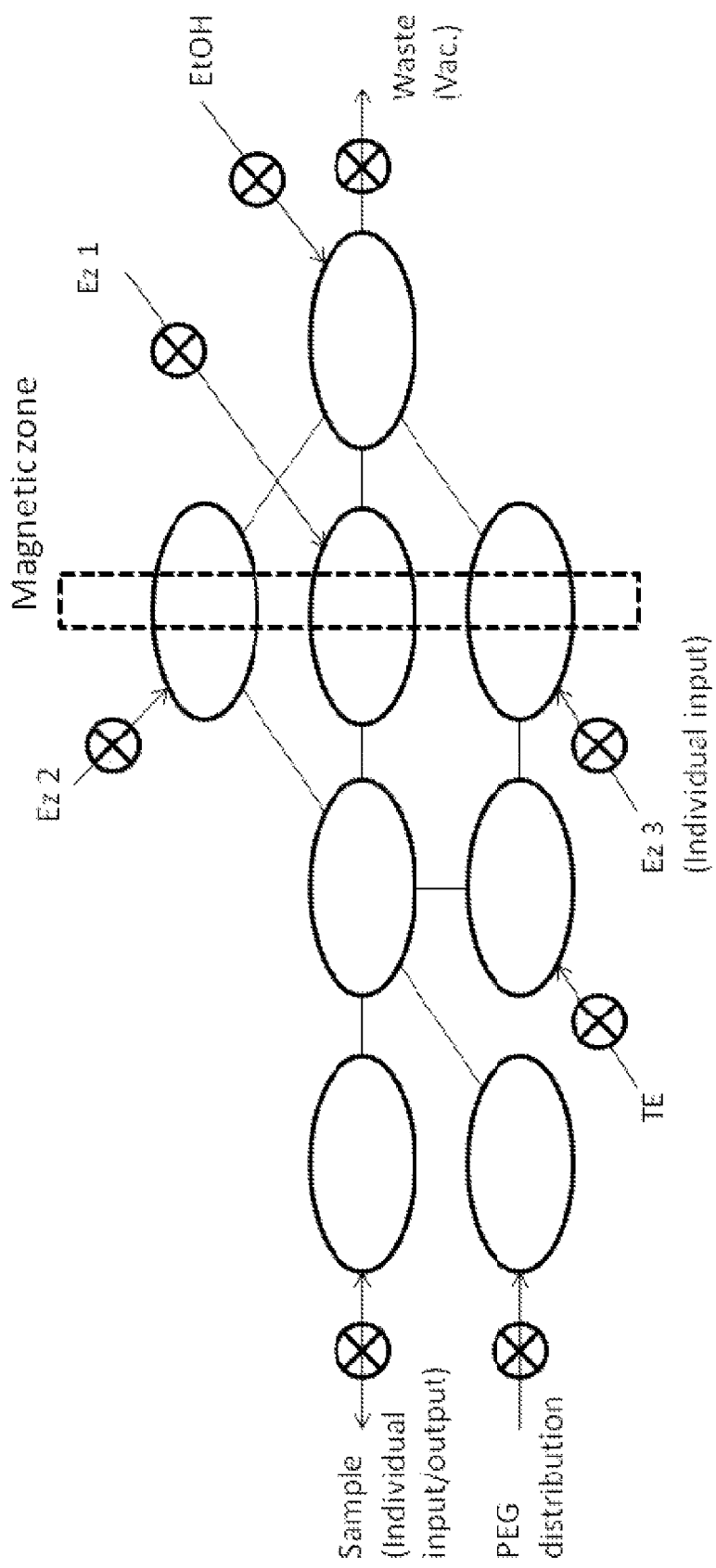
FIG. 16 shows various valve configurations for a fluidics device.

FIG. 16 shows various valve configurations for a fluidics device. Each valve (represented by an oval) includes a diaphragm comprises in a via layer, an elastic layer and an actuation layer. Each valve includes one or more vias directed through the via layer (see FIG. 11). Valves may be fluidically coupled to one or more other valves through one or more channels. The device includes a magnetic zone for providing a regulatable magnetic field to the fluidics device. This may aid in capturing attractable particles, such as beads. The valves regulate the flow rate of enzymes (Ez 1, Ez 2, Ez 3, etc.), solvents (e.g., ethanol, or EtOH), and other components (e.g., polyethyleneglycol, or PEG)

Example 6

Figure 17:
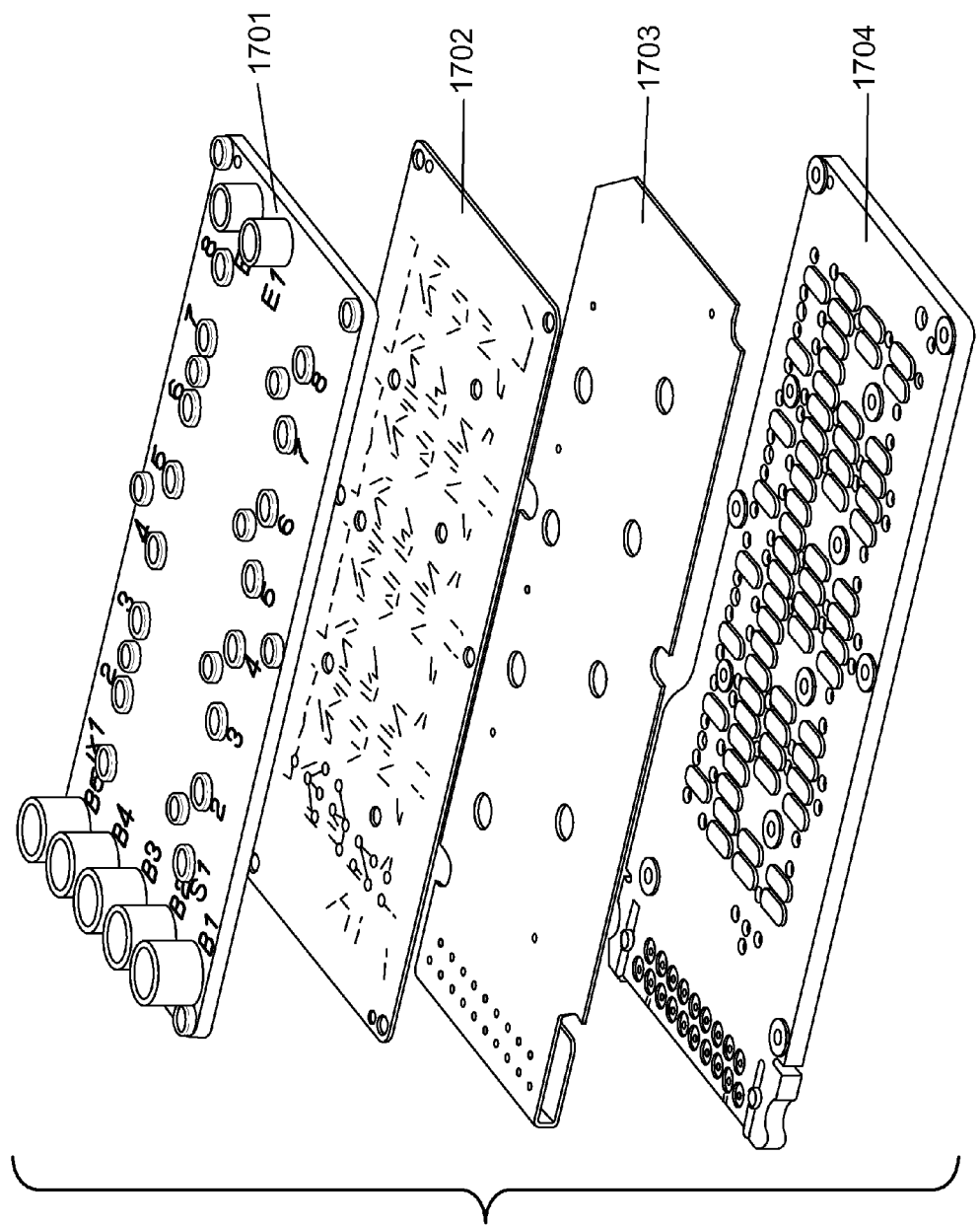
FIG. 17 shows a fluidics device having plurality of device layers.

FIG. 17 shows a fluidics device having a manifold 1701, via layer 1702, elastic layer 1703 and actuation layer 1704. The via layer 1702 can be a foil, such as a foil formed of a polymeric material or a metallic material. The actuation layer is a pneumatic carrier for providing positive or negative pressure to the elastic layer 1703. The manifold 1703, via layer 1702, elastic layer 1703 and actuation layer 1704 can be held together with the aid of a mechanical seal (e.g., clamp, glue).

Example 7

Figure 18A:
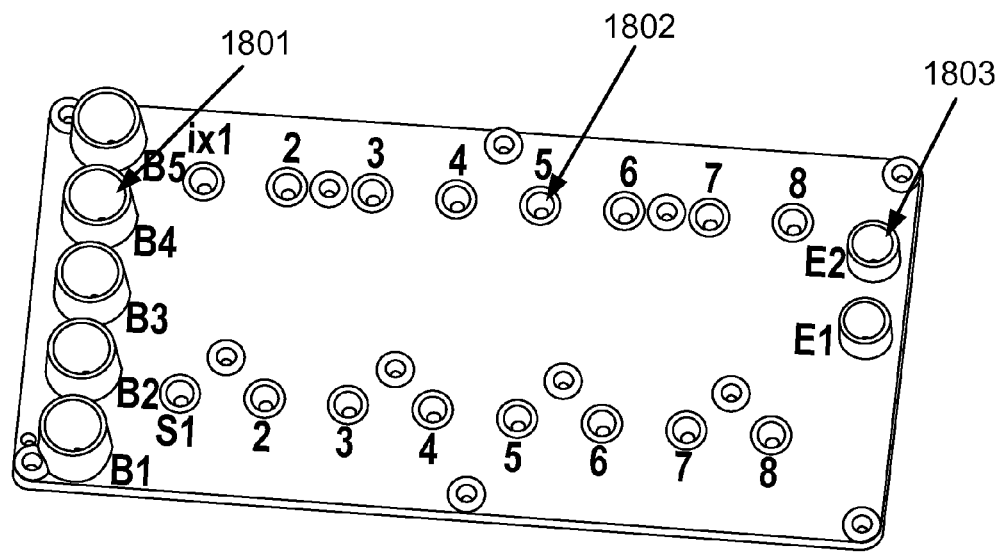
FIG. 18A illustrates a front view of a fluidics manifold.
Figure 18B:
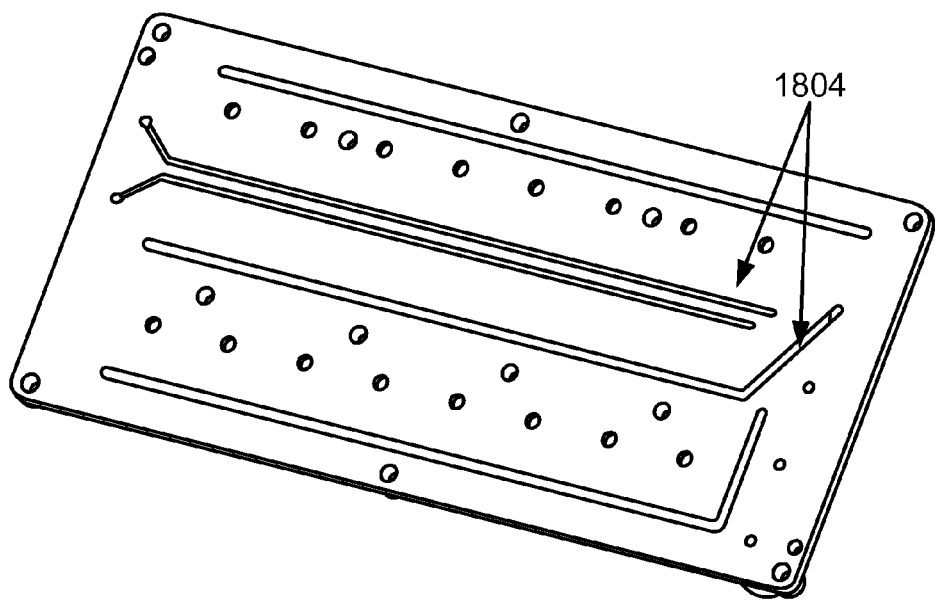
FIG. 18B illustrates an underside of the fluidics manifold.

FIGS. 18A and 18B show a manifold (or fluidics manifold) 1800. FIG. 18A is a front view of the manifold 1800; FIG. 18B shows an underside of the manifold 1800. The manifold has reagent distribution ports 1801, 1802 and 1803 of various sizes (volumes). At least some of the ports 1801, 1802 and 1803 are in fluid communication with reagent distribution lines (or channels) 1804. The ports can be chambers for accepting a fluid. The reagent distribution ports 1801, 1802 and 1803 can be between about 1 microliter (uL) and 300 uL in size, or 10 uL and 200 uL. The reagent distribution channels may have various sizes. Some reagent distribution channels are configured to flow a fluid at a flow rate of at least about 1 milliliter (mL)/s, or 2 mL/s, or 3 mL/s, or 4 mL/s, or 5 mL/s, or 10 mL/s, or 20 mL/s, or 40 mL/s. Other reagent distribution channels are configured to flow a fluid at a flow rate of at most about 1000 microliter (uL)/s, or 900 uL/s, or 800 uL/s, or 700 uL/s, or 600 uL/s, or 500 uL/s, or 400 uL/s, or 300 uL/s, or 200 uL/s, or 100 uL/s.

The reagent distribution lines are configured to come in fluid communication with vias or channels in a via layer of a fluidic device having the manifold. In some cases, the ports 1801, 1802 and 1803 and reagent distribution channels hold or transfer a fluid at the macroscale, whereas the vias or channels in the via layer transfer fluid at the microscale or even nanoscale.

Example 8

Figure 19A:
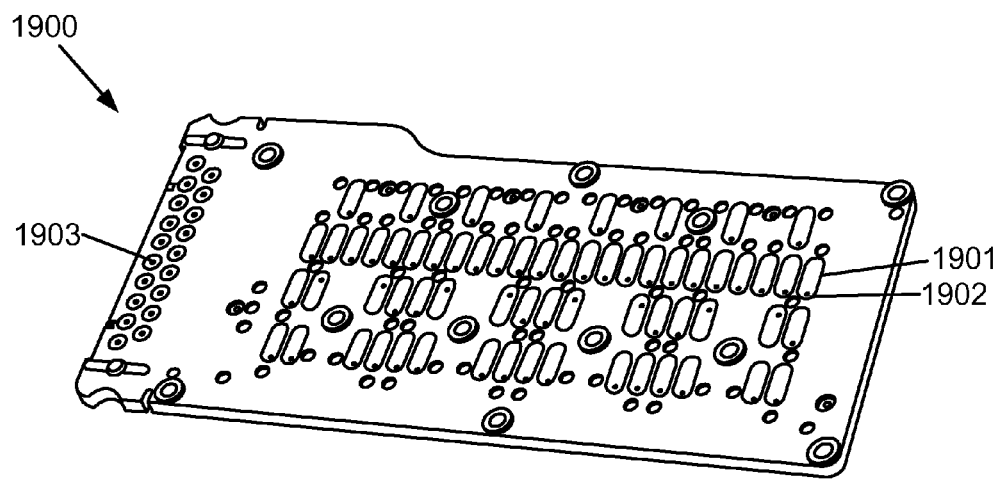
FIG. 19A shows a front view of a pneumatic carrier.
Figure 19B:
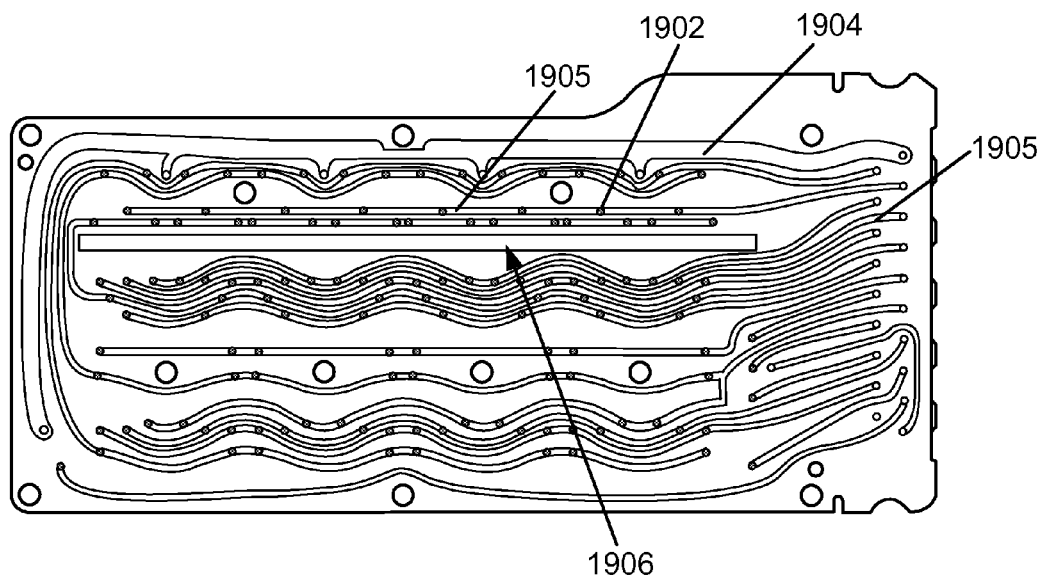
FIG. 19B shows an underside of the pneumatic carrier.

FIGS. 19A and 19B show a pneumatic carrier (or actuation layer) 1900 having a plurality of channels formed in the carrier 1900. FIG. 19A is a front view of the pneumatic carrier 1900; FIG. 19B shows an underside of the pneumatic carrier 1900. The pneumatic carrier includes a plurality of raised sealing rings 1901 having ports 1902 for providing positive or negative pressure to cavities defined by the sealing rings 1901. The sealing rings 1901 are configured to rest adjacent an elastic layer and below one or more vias in a via layer adjacent the elastic layer (see FIG. 11). The sealing rings 1901 and ports 1902 are in fluid communication with ports 1903 for providing pressure (positive or negative) to the cavities defined by the sealing rings 1901. Positive or negative pressure is conveyed to the cavities by channels formed in an underside of the pneumatic carrier 1900, as shown in FIG. 19B. The pneumatic carrier 1900 includes a first channel 1904 (e.g., waste channel) and one or more second channels 1905 for bringing the sealing rings 1901 in fluid communication with a source of positive or negative pressure. The pneumatic carrier 1900 includes a slot for a magnet 1906. The magnet may be used for capturing magnetic field-attractable particles during processing (e.g., fluid flow through a fluidics layer a device having the pneumatic carrier 1900).

Some of the channels of the pneumatic carrier 1900 can be grouped (or ganged). This permits control of a plurality of valves with the aid of a single source of positive or negative pressure.

Example 9

Figure 20:
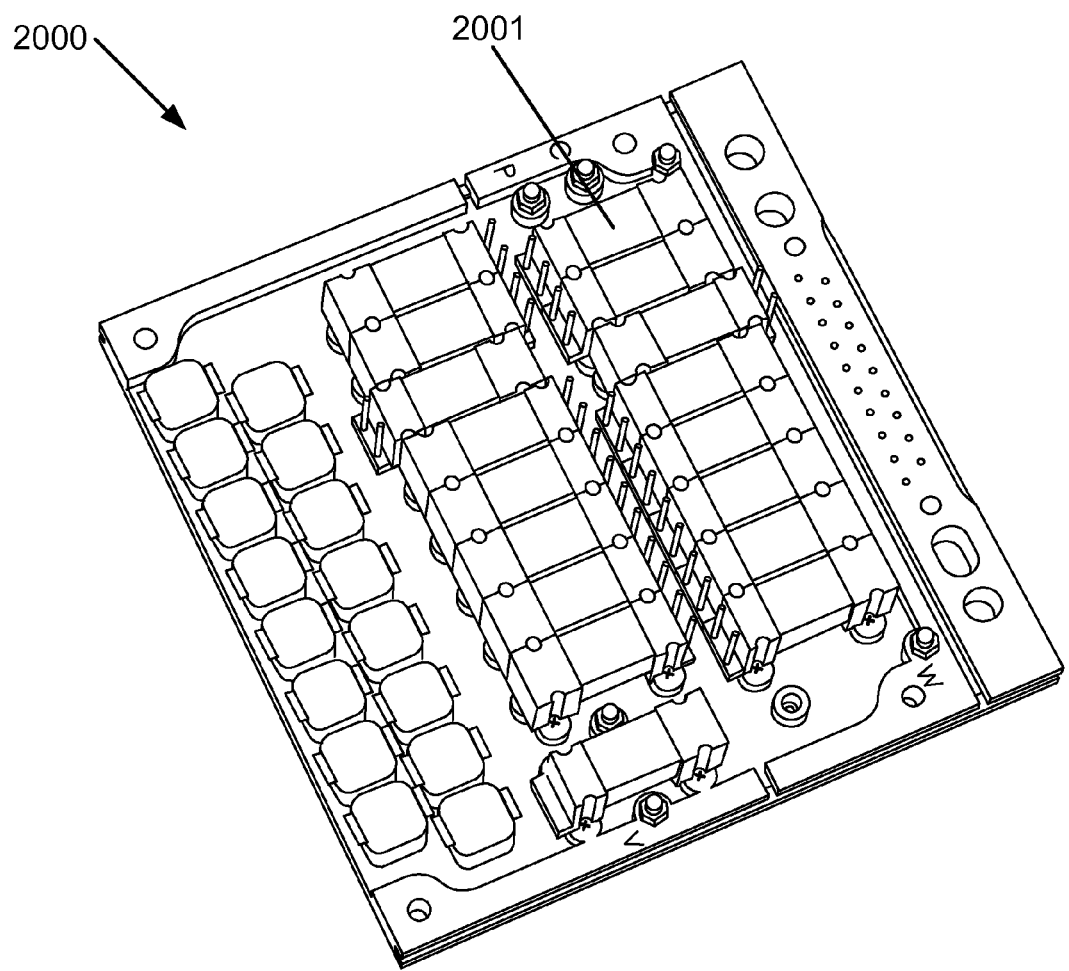
FIG. 20 schematically illustrates a solenoid valve.

FIG. 20 shows an interface manifold 2000 for mating with a pneumatic carrier (or actuation layer), such as the pneumatic layer 1900 of FIG. 19. The interface manifold 2000 includes solenoid valves 2001 for regulating the application of positive or negative pressure to various channels of the pneumatic carrier. The interface manifold 2000 permits the pressure of individual channels to be independently regulated. The solenoid valves 2001 are in fluid communication with a source of positive pressure (e.g., compressor) or negative pressure (e.g., vacuum pump).

Example 10

Figure 21:
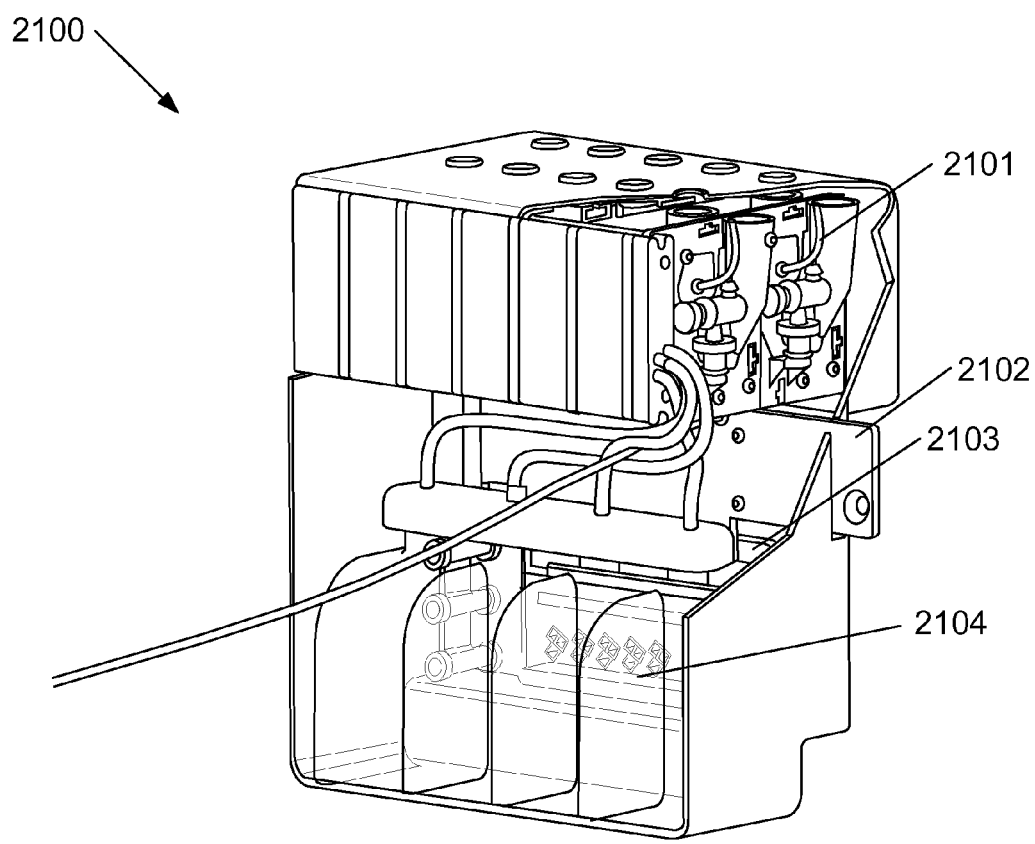
FIG. 21 schematically illustrates a fluidics system.

FIG. 21 shows a fluidics system 2100 having a sample processing module 2101, library construction module 2102, normalization module 2103 and chambers (or containers) for various reagents (e.g., buffers) or waste. The processing module 2101 comprises a fluidics manifold, a via layer adjacent the fluidics manifold, an elastic layer adjacent the via layer and an actuation layer adjacent the elastic layer (see, e.g., FIG. 11).

Figure 22A:
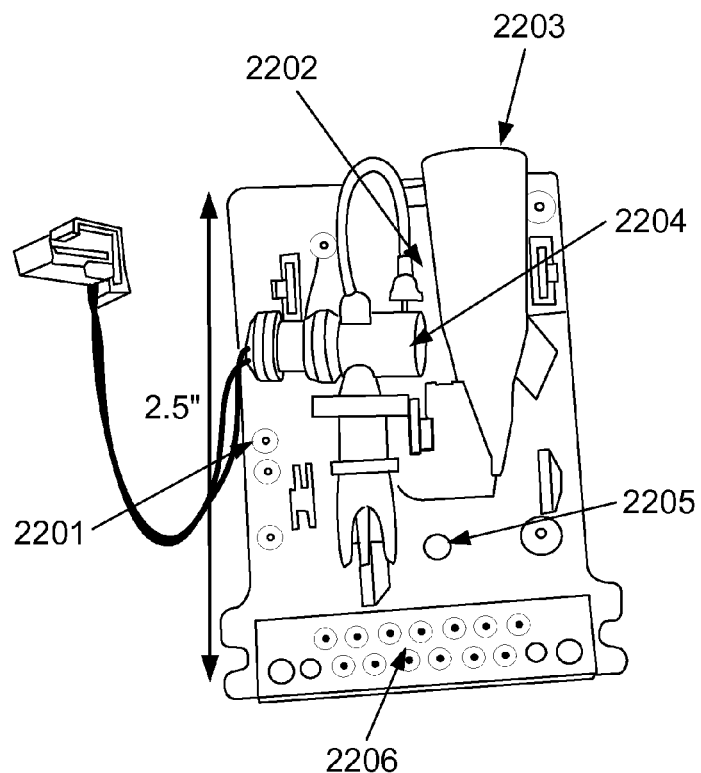
FIGS. 22A and 22B show a processing module, which can be used with the fluidics device of FIG. 21.
Figure 22B:
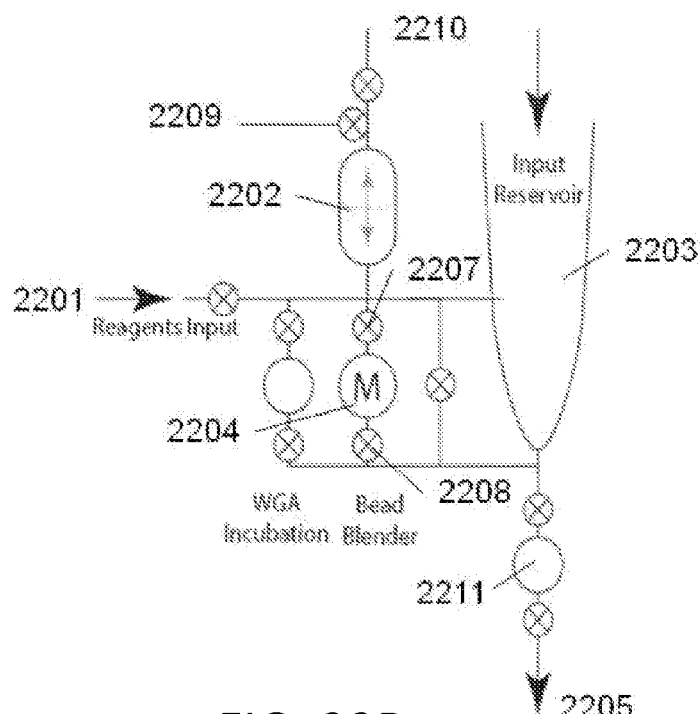

FIGS. 22A and 22B show an example of a sample processing module (or cartridge) 2200 that may be integrated into the fluidics system 2100. The module 2200 comprises a reagent input 2201, a pumping ballast and beads chamber 2202, a sample inlet 2203 (e.g., for accepting cotton swabs), a bead blender 2204, an output 2205 and a pneumatic interface 2206. The processing module 2200 further comprises a via layer, an elastic layer and an actuation layer.

The sample processing module 2200 performs the initial tasks of the workflow: cell disruption, DNA purification and whole genome amplification. The sample processing module can perform viral/cell/spore disruption, DNA purification, and whole genome amplification.

Lysis can be accomplished using a commercial off-the-shelf technology (e.g., Omnilyse, Claremont BioSciences) 2204 integrated on the cartridge 2200. For example, the Omnilyse from Claremont BioSciences provides bead beating in a miniature format by employing a rotating bed of zirconium beads; this device may effectively lyse spores and other types of cells. Paramagnetic bead-based purification is used to purify and concentrates the DNA from the lysates. Whole genomic amplification can be carried out isothermally using randomly primed multiple-strand displacement amplification.

This sample processing module cartridge is formed using rapid prototyping techniques having a design compatible with injection molding. A microfluidic foil and an elastomeric valve/pumping membrane are sandwiched between a pair of liquid and a pneumatic manifolds. The valves are actuated using pressure and/or vacuum through the pneumatic interface 2206. The liquid manifold also provides the interface and structural support for the on-board lysis device (mechanical bead blender). The cartridge has a funnel-shaped inlet 2203 that accepts a 0.3-1.5 mL sample that is then circulated through the bead blender for a predetermined period of time. Circulation is accomplished by opening valves 2207 and 2208, and cyclically opening valve 2209 (closing valve 2210) and opening 2210 (closing valve 2209). The sample is thus uniformly exposed to the lysis device 2204 while it is activated. Reagents for the subsequent SPRI clean-up (a PEG/magnetic beads mix and 70% ethanol (EtOH) for washing) are metered by a (similar) reagents distributor cartridge (not shown) and transferred using a back pressure into the reagents input 2201 and mixed with the sample. The beads are positioned in the smaller chamber 2202 using a magnet (not shown) or other magnetic-field-inducing device and DNA is captured on the beads. Wash solution is introduced through 2201 and passed over the beads. The beads now carrying the DNA are re-suspended in 60 µL EtOH (introduced through 2202) and pumped out via the Output port 2205 using pump 2211.

Figure 23A:
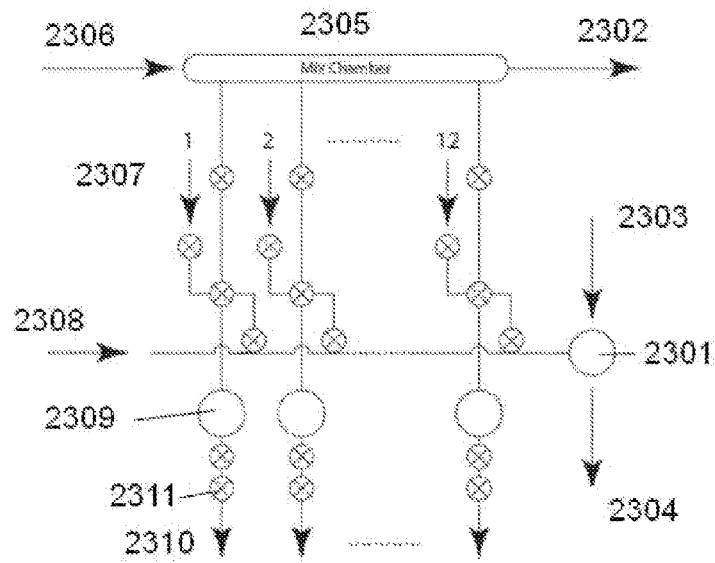
FIGS. 23A and 23B show a normalization module.
Figure 23B:
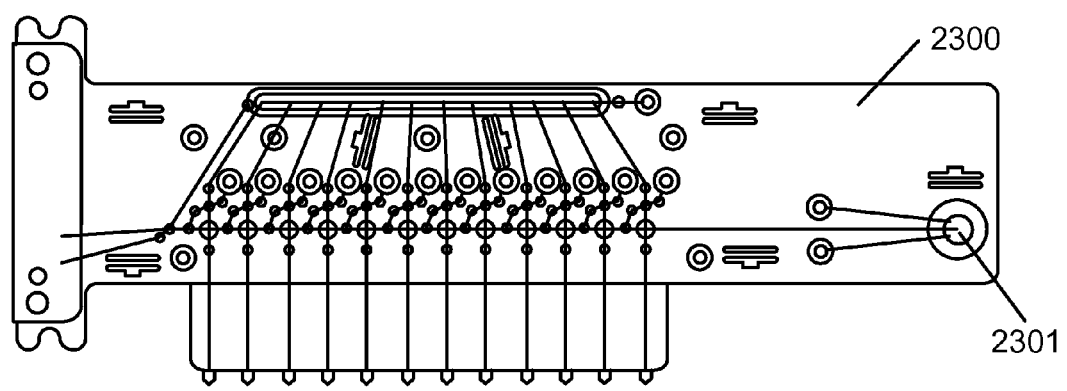

FIGS. 23A and 23B show an example of a normalization module that may be integrated into the fluidics system 2100 described above in the context of FIG. 21. The function of the normalization module can be to provide an optimal library concentration to the sequencer. The concentration of each library can be measured, for example, using a fluorescently stained sample and an off-the-shelf fluorimeter. In some embodiments, the concentration can be measured by UV spectrophotometry, conductivity, or other methods known in the art. Each library can then be diluted accordingly and optionally pooled. The normalization module can also efficiently transfer fluids between the other cartridge modules.

The function of the normalization module is to provide an optimal library concentration to the sequencer. The concentration of each library is measured using a fluorescently stained sample and off-the-shelf fluorimeter. Each is diluted accordingly and then pooled. FIG. 23B shows a normalization cartridge 2300 of the normalization module, which carries out all processes for 12 libraries. The concentration of ds-DNA in each library is measured at the optical flowcell 2301 using the pump 2309 to withdraw aliquots of library samples that enter the normalization module through interface 2310 and to withdraw dsDNA stain in buffer from dye input 2308, to mix and position the sample. The flowcell 2301 can be interrogated by a detector (not shown). The detector can be a fluorimeter, including a commercially available fluorimeter. After each measurement the optical flow cell is washed by a pressurized vial of wash buffer 2303 passed through the flow cell to waste 2304. This process can be carried out in series for each library. In some embodiments, multiple optical flow cells may be provided to simultaneously analyze more than one sequencing library.

Pooling of the libraries can be carried out by first pumping each library into mix chamber 2305. A controller can reference the measured dsDNA concentrations to modulate each of the pumping valves 2311 for each library appropriately, for example to produce a mixture comprising equal concentrations of each library. Transfer buffer 2306 can enter the mix chamber 2305 to dilute the libraries. Transfer buffer flow can also be used to push the pooled library to a sequencing module through port, channel or other fluidic connection 2302, such as a MiSeq flowcell.

Example 11

Figure 24:
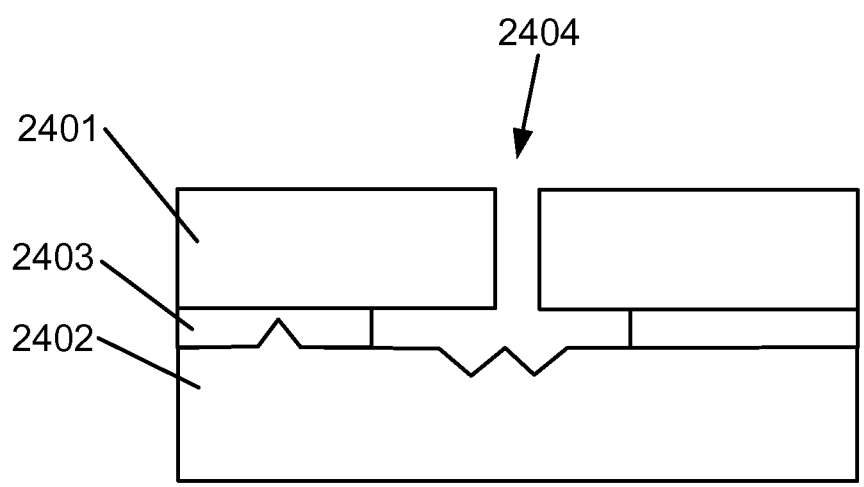
FIG. 24 shows various approaches for mechanically sealing a first layer against a second layer.

FIG. 24 shows an example for mechanically sealing a first layer 2401 against a second layer 2402. The first layer 2401 is sealed against the second layer 2402 with the aid of a sealant provided through a 2404 formed in the first layer 2401. Any force (or pressure) required to enable the sealant to fill one or more spaces between the first layer 2401 and the second layer 2402 can be provided by way of one or more of screws (e.g., metal screws, glue screws) and clamps (e.g., mechanical clamps). Alternative, the layers may be sealed against one another with the aid of high temperature lamination, such as, for example, if one of the layers is formed of a polymeric material.

Devices, systems and methods provided herein are combinable with, or modifiable by, other systems and methods, such as, for example, systems and/or methods described in U.S. Patent Publication No. 2004/0209354 to Mathies et al., filed on Dec. 29, 2003, U.S. Patent Publication 2005/0161669 to Jovanovich et al., filed on Feb. 2, 2005, and Anderson et al., "A miniature integrated device for automated multistep genetic assays," Nucleic Acids Res. 2000 June 15:28(12): E60.

It is to be understood that this invention is not limited to particular devices or methods, which can, of course, vary. It is also to be understood that the terminology used herein is for the purpose of describing particular embodiments only, and is not intended to be limiting. As used in this specification and the appended claims, the singular forms "a", "an" and "the" can include plural referents unless the content clearly dictates otherwise. Thus, for example, reference to "a component" can include a combination of two or more components, reference to "a reagent" can include mixtures of reagents, and the like.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A device comprising at least one diaphragm valve configured to regulate liquid flow in a microfluidic channel, the diaphragm valve comprised in a combination that comprises a fluidics layer, an actuation layer and an elastic layer sandwiched between the fluidics layer and the actuation layer, wherein a diaphragm in each diaphragm valve is comprised in the elastic layer and is mechanically sealed against the fluidics layer and against the actuation layer by a sealing ring in the actuation layer, wherein the actuation layer has a substantially flat surface, the sealing ring is raised above the flat surface and the sealing ring exerts localized pressure against the elastic layer.

2. The device of claim 1, further comprising a mechanical fastener configured to fasten the combination into a sandwich, wherein the mechanical fastener transmits pressure to a pressure seal.

3. The device of claim 2, wherein the mechanical fastener is selected from a screw, a clip, a snap, a staple, a rivet, a band and a pin.

4. The device of claim 1, wherein the elastic layer comprises a urethane, a nitrile, a latex or a silicone.

5. The device of claim 1, wherein the at least one diaphragm valve is a plurality of diaphragm valves.

6. The device of claim 1, wherein each diaphragm valve comprises:
a) a valve seat against which the diaphragm is configured to sit;
b) a valve relief defined at least in part by the sealing ring into which the diaphragm is configured to be deflected, thereby defining a valve chamber; and
c) a valve inlet and a valve outlet comprised in the fluidics layer and in fluid communication with the valve chamber,
wherein the diaphragm is configured to be actuated by positive or negative pressure transmitted through an actuation conduit in the actuation layer that communicates with the valve relief.

7. The device of claim 6, wherein the fluidics layer comprises a via layer and a fluidics manifold, wherein the via layer has a first face mated with the elastic layer and a second face mated with a fluidics manifold, wherein the valve inlet and valve outlet of each diaphragm valve are configured as vias through the via layer and each via is in fluidic communication with a microfluidic channel in the fluidics layer, and wherein the fluidics manifold comprises at least one compartment sealed by the second face of the via layer, wherein at least one macrofluidic chamber is in fluid communication with a microfluidic channel communicating with a via.

8. The device of claim 7, wherein the microfluidic channel is disposed in the second face of the via layer.

9. The device of claim 7, wherein the microfluidic channel is disposed in the fluidics manifold.

10. The device of claim 7, wherein the via layer is comprised of a flexible material.

11. The device of claim 7, wherein the fluidics manifold comprises a second compartment that opens toward the via layer and the via layer comprises an aperture exposing the second compartment to the elastic layer.

12. The device of claim 7, wherein the fluidics manifold and/or the actuation layer comprises a polymer selected from poly(acrylonitrile butadiene styrene) ("ABS"), acrylic, acetal, rubber, nylon, polycarbonate, polyether, polyester, polyurethane, polypropylene, polyolefin, cycloolefin, and copolymers or filled versions thereof.

13. The device of claim 7, wherein the fluidics manifold and/or the actuation layer are comprised of a rigid material.

14. The device of claim 6, wherein at least one actuation conduit is configured to transmit positive or negative pressure to a plurality of diaphragm valves.

15. The device of claim 6, wherein at least one actuation conduit is configured to transmit positive or negative pressure to a fluidic conduit.

16. The device of claim 6, wherein at least one actuation conduit traverses the actuation layer from a first face to a second, opposing face.

17. The device of claim 1 wherein the sealing ring contacts the elastic layer.

18. A method comprising:
a) providing a device comprising at least one diaphragm valve configured to regulate liquid flow in a microfluidic channel, the diaphragm valve comprised in a combination that comprises a fluidics layer, an actuation layer and an elastic layer sandwiched between the fluidics layer and the actuation layer, said elastic layer having a diaphragm that is mechanically sealed against the fluidics layer and against the actuation layer by a sealing ring in the actuation layer, wherein the actuation layer has a substantially flat surface, the sealing ring is raised above the flat surface and the sealing ring exerts localized pressure against the elastic layer;
wherein the fluidics layer comprises a via layer and a fluidics manifold, wherein said device comprises a first compartment and a second compartment in the fluidics manifold fluidically connected to each other through one of the diaphragm valves;
b) opening the diaphragm valve; and
c) moving liquid through the valve from one compartment to another.

19. The method of claim 18 wherein the sealing ring contacts the elastic layer.

20. The method of claim 18 wherein the valve is opened and/or closed with pneumatic pressure.

21. The method of claim 18 wherein liquid is moved with pneumatic pressure.

22. The method of claim 18 wherein liquid comprises magnetically responsive particles and the method comprises moving liquid with magnetically responsive particles into a chamber and immobilizing the particles in the chamber with a magnetic force.

23. The method of claim 18 comprising moving liquid into a chamber and performing thermal cycling on the liquid in the chamber.

24. A system comprising:
a) a device comprising a plurality of diaphragm valves,
each diaphragm valve configured to regulate liquid flow in a microfluidic channel and comprised in a combination having a fluidics layer, an actuation layer and an elastic layer sandwiched between the fluidics layer and the actuation layer, said elastic layer having a diaphragm that is mechanically sealed against the fluidics layer and the actuation layer by a sealing ring in the actuation layer, wherein the actuation layer has a substantially flat surface, the sealing ring is raised above the flat surface and the sealing ring exerts localized pressure against the elastic layer; and
wherein the diaphragm is configured to be actuated by positive or negative pressure transmitted through an actuation conduit in the actuation layer that communicates with the diaphragm;

b) a source of positive and/or negative pressure in communication with the actuation conduits; and c) a control unit comprising logic to open and/or close valves in a programmed sequence.

25. The system of claim 24 wherein the sealing ring contacts the elastic layer.

26. The system of claim 24 wherein each diaphragm valve comprises:
   i) a valve seat against which the diaphragm is configured to sit;
   ii) a valve relief defined at least in part by the sealing ring, into which the diaphragm is configured to be deflected thereby defining a valve chamber; and
   iii) a valve inlet and a valve outlet comprised in the fluidics layer and in fluid communication with the valve chamber.

27. The system of claim 24 further comprising:
   d) a magnet assembly configured to deliver a regulatable magnetic field to a chamber in a fluidic manifold of the device.

28. The system of claim 24 further comprising:
   d) a thermal control assembly configured to regulate temperature in a chamber in a fluidic manifold of the device.

29. The system of claim 24 further comprising:
   d) an optical assembly configured to detect analytes in the system.

30. The system of claim 24 further comprising:
   d) a fluidic assembly comprising (1) elements to engage the fluidic portion of the device and (2) a fluid delivery assembly configured to deliver fluids to a fluidics manifold or to the microfluidic conduits; and
   e) an actuation assembly comprising (1) an actuation manifold configured to mate or align with ports on the microfluidic device and to deliver actuant into the actuation conduits microfluidic device; and (2) an actuant delivery assembly, configured to deliver an actuant to the actuation manifold or to the actuation conduits directly.

31. The system of claim 24 wherein the source of pressure delivers pneumatic pressure.

* * * * *